United States Patent
Mambakkam et al.

(10) Patent No.: US 7,162,549 B2
(45) Date of Patent: Jan. 9, 2007

(54) MULTIMODE CONTROLLER FOR INTELLIGENT AND "DUMB" FLASH CARDS

(75) Inventors: Sreenath Mambakkam, San Jose, CA (US); Larry Lawson Jones, Palo Alto, CA (US); Arockiyaswamy Venkidu, Menlo Park, CA (US); Nicholas Antonopoulos, San Jose, CA (US)

(73) Assignee: Onspec Electronics, Inc., Cupertino, CA (US)

( * ) Notice: Subject to any disclaimer, the term of this patent is extended or adjusted under 35 U.S.C. 154(b) by 0 days.

(21) Appl. No.: 10/264,466

(22) Filed: Oct. 4, 2002

(65) Prior Publication Data

US 2003/0093606 A1    May 15, 2003

Related U.S. Application Data

(63) Continuation-in-part of application No. 10/063,021, filed on Mar. 12, 2002, and a continuation-in-part of application No. 10/002,567, filed on Nov. 1, 2001, now abandoned, and a continuation-in-part of application No. 10/039,685, filed on Oct. 29, 2001, now Pat. No. 6,832,281.

(60) Provisional application No. 60/386,396, filed on Jun. 4, 2002.

(51) Int. Cl.
*G06F 3/00* (2006.01)
*G06F 13/00* (2006.01)
*G06F 11/00* (2006.01)
*G11C 29/00* (2006.01)

(52) U.S. Cl. .............. 710/16; 710/8; 710/17; 710/19; 710/74; 714/1; 714/42; 714/773

(58) Field of Classification Search ............... 710/63, 710/62, 65, 72–74, 8, 12; 714/1, 42, 773
See application file for complete search history.

(56) References Cited

U.S. PATENT DOCUMENTS

| | | | |
|---|---|---|---|
| 5,296,692 A | | 3/1994 | Shino |
| 5,740,349 A | * | 4/1998 | Hasbun et al. .................. 714/8 |
| 5,786,769 A | | 7/1998 | Coteus et al. |
| 5,802,553 A | * | 9/1998 | Robinson et al. ........... 711/103 |
| 5,815,426 A | | 9/1998 | Jigour et al. |
| 5,844,910 A | * | 12/1998 | Niijima et al. .............. 714/710 |
| 5,887,145 A | | 3/1999 | Harari et al. |

(Continued)

FOREIGN PATENT DOCUMENTS

JP         08-235028    *   9/1996

(Continued)

OTHER PUBLICATIONS

JPO Machine Translation of JP11-53485.*

(Continued)

*Primary Examiner*—Kim Huynh
*Assistant Examiner*—Alan S. Chen
(74) *Attorney, Agent, or Firm*—Greenberg Traurig, LLP; John P. Ward

(57) ABSTRACT

A controller chip for coupling a computer system with a flash storage system is disclosed. The controller chip comprises an interface mechanism for determining whether the Flash storage system includes a controller and an adapter for providing the appropriate interface to the computer system to allow the computer system to communicate with the Flash storage system. In a preferred embodiment, the flash storage system comprising at least a portion of a medium ID section; and a flash section, wherein the medium ID section contains specifications of the medium ID. Through the use of this system a plurality of different adapters and a flash storage system can be managed while utilizing the same hardware components.

22 Claims, 35 Drawing Sheets

U.S. PATENT DOCUMENTS

| | | | |
|---|---|---|---|
| 5,928,347 | A | 7/1999 | Jones |
| D416,541 | S | 11/1999 | Hirai et al. |
| 5,995,376 | A | 11/1999 | Schultz et al. |
| 6,006,295 | A | 12/1999 | Jones et al. |
| 6,075,706 | A | 6/2000 | Learmonth et al. |
| 6,088,802 | A | 7/2000 | Bialick et al. |
| 6,145,046 | A | 11/2000 | Jones |
| 6,175,517 | B1 | 1/2001 | Jigour et al. |
| 6,182,162 | B1 | 1/2001 | Estakhri et al. |
| 6,199,122 | B1 * | 3/2001 | Kobayashi ............... 710/36 |
| 6,266,724 | B1 | 7/2001 | Harari et al. |
| 6,279,069 | B1 | 8/2001 | Robinson et al. |
| 6,292,863 | B1 | 9/2001 | Terasaki et al. |
| 6,330,688 | B1 * | 12/2001 | Brown ...................... 714/7 |
| 6,353,870 | B1 | 3/2002 | Mills et al. |
| 6,405,323 | B1 | 6/2002 | Lin et al. |
| 6,408,352 | B1 | 6/2002 | Hosaka et al. |
| 6,438,638 | B1 * | 8/2002 | Jones et al. ............. 710/301 |
| 2001/0014934 | A1 | 8/2001 | Toba |
| 2002/0111771 | A1 * | 8/2002 | Huang et al. ............ 702/186 |
| 2002/0185533 | A1 * | 12/2002 | Shieh et al. ............. 235/441 |
| 2003/0038177 | A1 * | 2/2003 | Morrow .................... 235/441 |
| 2003/0041203 | A1 * | 2/2003 | Jones et al. ............. 710/301 |
| 2003/0041284 | A1 * | 2/2003 | Mambakkam et al. ...... 714/15 |
| 2003/0046469 | A1 | 3/2003 | Liu et al. |
| 2003/0084220 | A1 | 5/2003 | Jones et al. |
| 2003/0084221 | A1 * | 5/2003 | Jones et al. ............. 710/302 |
| 2003/0093606 | A1 * | 5/2003 | Mambakkam et al. ..... 710/305 |
| 2004/0027879 | A1 * | 2/2004 | Chang ..................... 365/200 |

FOREIGN PATENT DOCUMENTS

| | | | |
|---|---|---|---|
| JP | 11-53485 | * | 2/1999 |
| WO | WO 00/23936 | * | 4/2000 |

OTHER PUBLICATIONS

JPO Machine Translation of JP08-235028.*

* cited by examiner

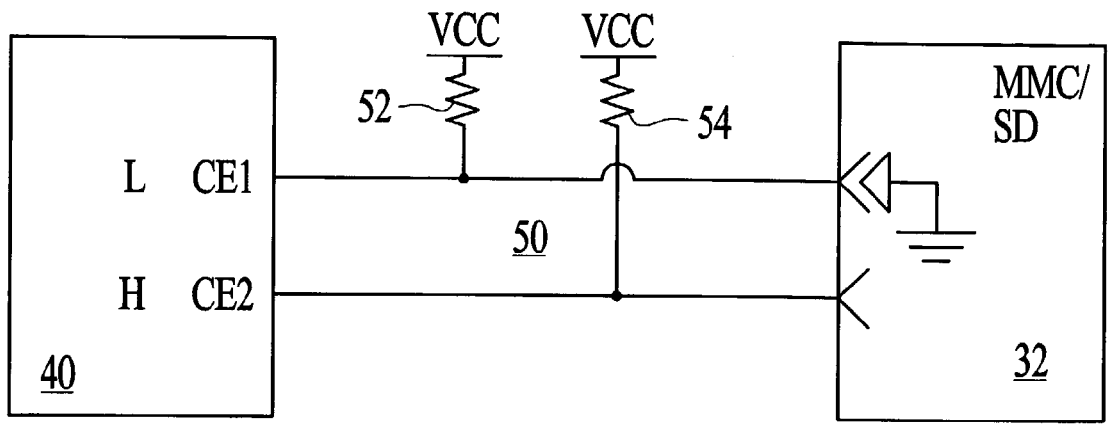
LH = MMC/SD    FIG. 4C
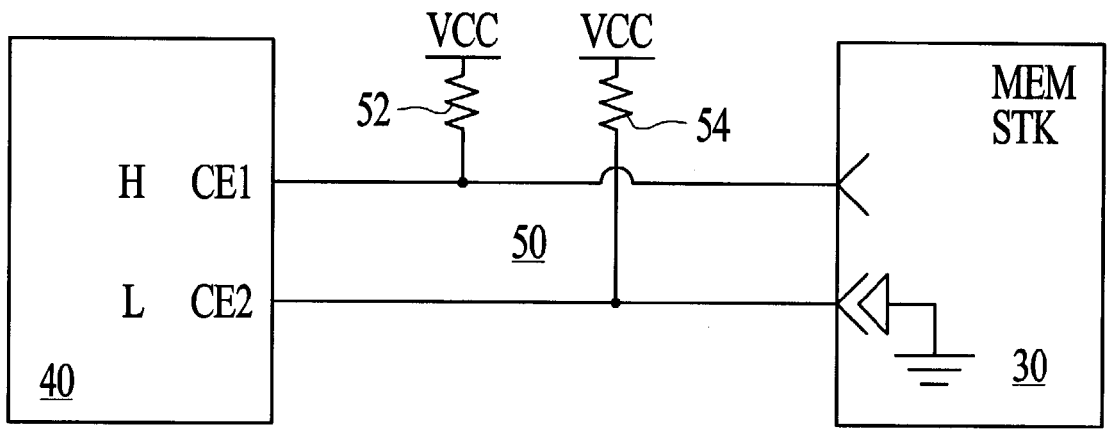
HL = MEM STK    FIG. 4D
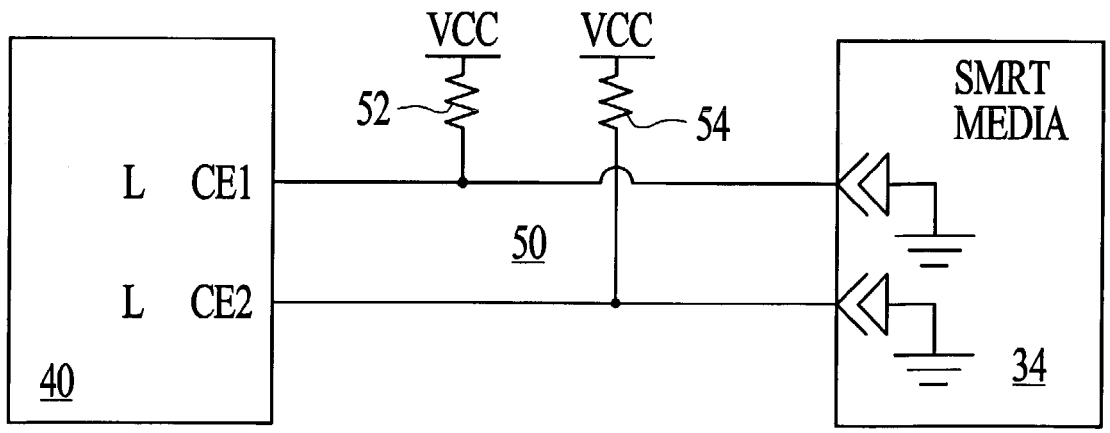
LL = SMRT MEDIA    FIG. 4E

| Pin | CF | Smart Media | MMC/SD | Memory Stick |
|---|---|---|---|---|
| 1 | Ground | Ground | Ground | Ground |
| 2 | D3 | D3 | — | — |
| 3 | D4 | D4 | — | — |
| 4 | D5 | D5 | — | — |
| 5 | D6 | D6 | — | — |
| 6 | D7 | D7 | — | — |
| 7 | -CE1 | -SMCS | — | — |
| 8 | A10 | — | — | — |
| 9 | -OE | -OE | — | — |
| 10 | A9 | — | — | — |
| 11 | A8 | — | — | — |
| 12 | A7 | — | — | — |
| 13 | Power | Power | Power | Power |
| 14 | A6 | CLE | | |
| 15 | A5 | ALE | | |
| 16 | A4 | READY | | |
| 17 | A3 | -WP | | |
| 18 | A2 | LVD | SCLK | SCLK |
| 19 | A1 | | DIO | DIO |
| 20 | A0 | | CMD | BS |
| 21 | D0 | D0 | | |
| 22 | D1 | D1 | | |
| 23 | D2 | D2 | | |
| 24 | — | — | — | — |
| 25 | -CD2 | -CD2 | -CD2 | -CD2 |
| 26 | -CD1 | -CD1 | -CD1 | -CD1 |
| 27 | D11 | — | — | — |
| 28 | D12 | — | — | — |
| 29 | D13 | — | — | — |
| 30 | D14 | — | — | — |
| 31 | D15 | — | — | — |
| 32 | -CE2 | — | — | — |
| 33 | — | — | — | — |
| 34 | tie high | — | — | — |
| 35 | tie high | — | — | — |
| 36 | -WE | -WE | — | — |
| 37 | INTRQ | — | — | — |
| 38 | Power | Power | Power | Power |
| 39 | — | — | — | — |
| 40 | — | — | — | — |
| 41 | RESET | — | — | — |
| 42 | — | — | — | — |
| 43 | — | — | — | — |
| 44 | -REG | — | — | — |
| 45 | — | — | — | — |
| 46 | — | — | — | — |
| 47 | D8 | — | — | — |
| 48 | D9 | — | — | — |
| 49 | D10 | — | — | — |
| 50 | Ground | Ground | Ground | Ground |

| Sl. No | Flash adapter (Input) | Interface (Output) |
|---|---|---|
| 1 | MultiMediaCard (MMC) | CompactFlash |
| 2 | MultiMediaCard (MMC) | IDE |
| 3 | MultiMediaCard (MMC) | PCMCIA |
| 4 | Secure Digital Card (SD) | CompactFlash |
| 5 | Secure Digital Card (SD) | IDE |
| 6 | Secure Digital Card (SD) | PCMCIA |
| 7 | SmartMedia (SM) | CompactFlash |
| 8 | SmartMedia (SM) | IDE |
| 9 | SmartMedia (SM) | PCMCIA |
| 10 | Memory Stick (MS) | CompactFlash |
| 11 | Memory Stick (MS) | IDE |
| 12 | Memory Stick (MS) | PCMCIA |
| 13 | CompactFlash (CF) | IDE |
| 14 | CF + SM + MS + MMC + SD | IDE |
| 15 | CF Console with adapters for SM, MS, MMC, SD | IDE |

FIG. 18

| Pin | CF | Smart Media | MMC/SD | Memory Stick |
|---|---|---|---|---|
| 1 | Ground | Ground | Ground | Ground |
| 2 | D3 | D3 | — | — |
| 3 | D4 | D4 | — | — |
| 4 | D5 | D5 | — | — |
| 5 | D6 | D6 | — | — |
| 6 | D7 | D7 | — | — |
| 7 | -CE1 | -SMCS | — | — |
| 8 | A10 | — | — | — |
| 9 | -OE | -OE | — | — |
| 10 | A9 | — | — | — |
| 11 | A8 | — | — | — |
| 12 | A7 | — | — | — |
| 13 | Power | Power | Power | Power |
| 14 | A6 | CLE | | |
| 15 | A5 | ALE | | |
| 16 | A4 | READY | | |
| 17 | A3 | -WP | | |
| 18 | A2 | LVD | SERCLK | SERCLK |
| 19 | A1 | | DATAIO | DATAIO |
| 20 | A0 | | CMD | BITSET |
| 21 | D0 | D0 | | |
| 22 | D1 | D1 | | |
| 23 | D2 | D2 | | |
| 24 | — | — | — | — |
| 25 | -CD2 | -CD2 | -CD2 | -CD2 |
| 26 | -CD1 | -CD1 | -CD1 | -CD1 |
| 27 | D11 | — | — | — |
| 28 | D12 | — | — | — |
| 29 | D13 | — | — | — |
| 30 | D14 | — | — | — |
| 31 | D15 | — | — | — |
| 32 | -CE2 | — | — | — |
| 33 | — | — | — | — |
| 34 | tie high | — | — | — |
| 35 | tie high | — | — | — |
| 36 | -WE | -WE | — | — |
| 37 | INTRQ | — | — | — |
| 38 | Power | Power | Power | Power |
| 39 | — | — | — | — |
| 40 | — | — | — | — |
| 41 | RESET | — | — | — |
| 42 | — | — | — | — |
| 43 | — | — | — | — |
| 44 | -REG | — | — | — |
| 45 | — | — | — | — |
| 46 | — | — | — | — |
| 47 | D8 | — | — | — |
| 48 | D9 | — | — | — |
| 49 | D10 | — | — | — |
| 50 | Ground | Ground | Ground | Ground |

FIG. 20

| Media Type | CE1 | CE2 | A3 | A5 | A6 | CD1 | CD2 |
|---|---|---|---|---|---|---|---|
| CompactFlash | 1 | 1 | 1 | 1 | 1 | 0 | 0 |
| Memory Stick | 1 | 0 | 1 | 1 | 1 | 0 | 0 |
| MMC/SD card | 0 | 1 | 1 | 1 | 1 | 0 | X |
| SmartStack NAND | 0 | 0 | 0 | 0 | 0 | 0 | 0 |
| SmartStack NOR | 0 | 0 | 1 | 0 | 0 | 0 | 0 |
| Reserved | 0 | 0 | 0 | 1 | 0 | 0 | 0 |
| Reserved | 0 | 0 | 1 | 0 | 1 | 0 | 0 |
| Reserved | 0 | 0 | 0 | 1 | 1 | 0 | 0 |
| Reserved | 0 | 0 | 1 | 0 | 1 | 0 | 0 |
| Reserved | 0 | 0 | 0 | 1 | 1 | 0 | 0 |
| Smart Media | 0 | 0 | 1 | 1 | 1 | 0 | 0 |

FIG. 23

| S[3:0] | Flash Chip |
|---|---|
| 0 | 1 |
| 1 | 2 |
| 2 | 3 |
| 3 | 4 |
| 4 | 5 |
| 5 | 6 |
| 6 | 7 |
| 7 | 8 |
| 8 | 9 |
| 9 | 10 |
| A | 11 |
| B | 12 |

FIG. 24

| Pin | CompactFlash Signal | SmartStack Signal |
|---|---|---|
| 14 | A6 | S0 |
| 7 | -CE1 | S1 |
| 32 | -CE2 | S2 |
| 20 | A0 | S3 |

FIG. 24A

| Byte 0 | Byte 1 | Byte 2 | Byte 3 | Description |
|---|---|---|---|---|
| C3 | B6 | 00 | Xx | Reserved |
| C3 | B6 | 01 | AAH | Secure area starts here. If Byte 3 is AA, this is the last block, else it is 00 to denote a continuation in the next block. |
| C3 | B6 | 02 | AAH | Secure area ends here. |
| C3 | B6 | 03 | AAH | Biometric area starts here. If Byte 3 is AA, this is the last block, else it is 00. |
| C3 | B6 | 04 | AAH | Biometric area ends here. |
| C3 | B6 | 05-54H | Xx | Reserved |
| C3 | B6 | 55H | Xx | Start of Firmware block, fw is < 16K. If Byte 3 is 00, then there are more blocks to follow. |
| C3 | B6 | 56H-A9H | Xx | Reserved |
| C3 | B6 | AAH | AAH | End of Firmware block. Byte 3 is AA to denote end block. |
| C3 | B6 | ABH-FEH | Xx | Reserved |
| C3 | B6 | FFH | FF | Blank block |

FIG. 26

MULTIMODE CONTROLLER FOR INTELLIGENT AND "DUMB" FLASH CARDS

RELATED APPLICATIONS

This application is claiming, under 35 USC §119(e), the benefit of provisional patent application Ser. No. 60/386,396 filed on Jun. 4, 2002.

Further, the present application is a continuation-in-part of applications Ser. No. 10/039,685, filed Oct. 29, 2001 now U.S. Pat. No. 6,832,281, entitled "Flashtoaster for Reading Several Types of Flash Memory Cards With or Without a PC," Ser. No. 10/002,567 filed Nov. 1, 2001 now abandoned, entitled "Active Adapter Chip for Use in a Flash Card Reader, and Ser. No. 10/063,021 filed Mar. 12, 2002, entitled "Memory Module Which Includes a Form Factor Connector."

FIELD OF THE INVENTION

The present invention relates generally to controllers and more particularly to controllers for Flash cards.

BACKGROUND OF THE INVENTION

Digital cameras have become one of the most popular of electronic devices. In a recent year, more digital cameras were sold than traditional film cameras. Images from digital cameras can be downloaded and stored on personal computers. Digital pictures can be converted to common formats such as JPEG and sent as e-mail attachments or posted to virtual photo albums on the Internet. Video as well as still images can be captured, depending on the kind of digital camera.

Digital cameras typically capture images electronically and ultimately store the images as bits (ones and zeros) on a solid-state memory. Flash memory is the most common storage for digital cameras. Flash memory contains one or more electrically-erasable read-only-memory (EEPROM) integrated circuit chips that allow reading, writing, and block erasing.

Early digital cameras required the user to download or transfer the images from the flash memory within the digital camera to a personal computer (PC). A standard serial cable was most widely used. However, the limited transfer rate of the serial cable and the large size of the digital images made such serial downloads a patience-building experience. Serial downloads could easily take half an hour for only a few dozen images.

Digital camera manufacturers solved this problem by placing the flash memory chips on a small removable card. The flash-memory card could then be removed from the digital camera, much as film is removed from a standard camera. The flash-memory card could then be inserted into an appropriate slot in a PC, and the image files directly copied to the PC.

FIG. 1A shows a flash memory card and adapter for transferring images from a digital camera to a PC. A user takes pictures with digital camera 14 that are stored in image files on flash memory chip(s). The flash memory chip is contained in CompactFlash card 16, which can be removed from digital camera 14 by pressing a card-eject button. Thus CompactFlash card 16 contains the image files.

While some smaller hand-held computers or personal-digital-assistants (PDA) have slots that receive Compact-Flash cards, most PCs do not. Laptop or notebook PCs have PC-card (earlier known as PCMCIA, Personal Computer Memory Card International Association) slots that can receive PCMCIA cards. Many functions have been placed on PCMCIA cards, such as modems, Ethernet, flash memory, encryption keys, and even miniature hard drives.

CF-to-PCMCIA adapter 10 is a passive adapter that contains an opening that receives CompactFlash card 16. FIG. 1B shows CF-to-PCMCIA adapter 10 with Compact-Flash card 16 inserted. Such CF-to-PCMCIA adapters 10 sell for as little as $5–10. CompactFlash is a trademark of SanDisk Corp. of Sunnyvale, Calif.

FIG. 1C shows a PC connected to a PCMCIA reader. Most laptop and notebook PCs contain one or two PCMCIA slots 22 that CF-to-PCMCIA adapter 10 can fit into. Then the user merely has to copy the image files from CompactFlash card 16 (not shown) to the hard disk of PC 20. Since high-speed parallel buses are used, transfer is rapid, about the same speed as accessing the hard disk. Thus a half-hour serial-cable transfer can be reduced to less than a minute with the $5 CF-to-PCMCIA adapter.

Desktop PCs usually do not have PCMCIA slots. Then PCMCIA reader 12 can be used. PCMCIA reader 12 accepts CF-to-PCMCIA adapter 10 and connects to PC 20 (not shown) through a parallel or high-speed Universal Serial Bus (USB) cable.

Multiple Flash-Card Formats

Although the CompactFlash card format is relatively small, being not much more than an inch square, other smaller cards have recently emerged. FIG. 2A illustrates various formats of flash-memory cards used with digital cameras. Many digital cameras still use CompactFlash card 16, which can be inserted into CF-to-PCMCIA adapter 10 for transfer to a PC. Other smaller, thinner formats have emerged and are used with some manufacturer's digital cameras. For example, SmartMedia card 24 is less than half an inch long, yet has enough flash memory capacity for dozens of images. SmartMedia-to-PCMCIA adapter 10' is available commercially for about $60. The higher cost is believed to be due to a converter chip within adapter 10. Also, different adapters 10 are required for different memory capacities of SmartMedia card 24. SmartMedia is a trademark of the SSFDC Forum of Tokyo, Japan.

Other kinds of flash-memory cards that are being championed by different manufacturers include MultiMediaCard (MMC) 28 and the related Secure Digital Card (SD) 26. MMC is controlled by MultiMediaCard Association that includes SanDisk Corp., Infineon Technologies, and others, while SD is controlled by the SD Group that includes Matsushita Electric Industrial Co., SanDisk Corporation, and Toshiba Corp., among others. Another emerging form factor from Sony Corporation is Memory Stick card 18. Memory Stick has a PCMCIA/Floppy adapter while MMC has a floppy adapter.

The different physical shapes and pin arrangements of cards 24, 26, 28 and Memory Stick card 18 prevent their use in CF-to-PCMCIA adapter 10. Indeed, most of these cards 24, 26, 28 have less than a dozen pins, while CompactFlash card 16 has a larger 50-pin interface. Furthermore, serial data interfaces are used in the smaller cards 24, 26, 28 while a parallel data bus is used with CompactFlash card 16.

FIG. 2B shows a Memory Stick-to-PCMCIA adapter using an active converter chip 11. Memory Stick card 18 (not shown) fits into an opening in Memory Stick-to-PCMCIA adapter 15, allowing adapter 15 and the Memory Stick to be plugged into a standard PCMCIA slot on a PC.

However, adapter 15 has an integrated circuit (IC) converter chip 11 within it. Converter chip 11 may be needed to convert the serial data format of Memory Stick card 18 to the parallel data format of a 68-pin PCMCIA slot. Inclusion of converter chip 11 in adapter 15 significantly increases the cost and complexity of adapter 15 compared to CF-to-PCMCIA adapter 10 which is a passive adapter without a converter chip.

While the advances in flash-memory card technology are useful, the many different card formats present a confusing array of interface requirements to a PC. Different adapters are needed for each of the card formats. PCMCIA card reader 12 can be replaced with other format readers, such as a SmartMedia Card reader, and even some multi-standard readers are available, such as a reader from Lexar Media that reads CompactFlash or SmartMedia in addition to PCMCIA.

The PCMCIA card interface (68-pins) has been around for a number of years and has been used extensively as an expansion slot for notebooks and other mobile computing devices. It is envisaged to use this popular interface to connect various devices such as SmartMedia, Memory Stick, MultimediaCard, Secure Digital card, Memory Stick V2 (also called the Duo), USB expansion slot, etc., to a computing system, printer, PDA or other system, which has a mating 68 pin connector.

When such adapters (68-pin or any other pin/interface based adapter) are used to interchangeably connect to the computing system, a method of storing these adapters near the slot is desired (see FIG. 2C).

FIG. 2C illustrates a conventional bay 100 for storing the adapters (front view). The bay 100 includes an interface port 102 and slots 103, 104 and 106 for storing adapters. The interface port 102 is the port to which dissimilar interfaces are connected via adapters. For example, a CompactFlash (or PCMCIA) interface can connect to a computing system, acting as the interface port for which other interfaces, such as SmartMedia, Memory Stick, Duo, USB, 1394, etc., can use adapters. The storage bay keeps all the adapters together.

In this type of bay, the upper slots are mounted right side up but the bottom slots require user to invert the media before inserting it into the slot. Since the slots are mounted on either side of a PCB (printed circuit board) the bottom slots are also very difficult to access. A new adapter for the upcoming smaller footprint Memory Stick (also called the Duo) is desired so as to mate it with 68-pin PCMCIA interface or 50-pin CompactFlash interface or any other similar interface. Therefore it is desirable to have a scheme wherein:

1. All slots are designed such that the flash media can be inserted face up into each slot.

2. There is comfortable separation space between the upper and lower row of slots.

What is desired is a universal adapter for flash-memory cards of several different formats. An adapter that accepts SmartMedia, MultiMediaCard, Secure Digital, and Memory Stick cards is desired. A flash-card reader with a single slot that accepts any format card using the adapter is desired. Special detection logic on the flash reader is desired to distinguish between the many flash-card formats. A low-cost passive adapter is desired that does not need an expensive converter chip. A multi-format reader is desired for a PC. A stand-alone flash reader is desired that can copy image files from flash cards without a PC.

What is further desired is an active adapter that can be used for interchangeably connecting different memory/memories to a device. For example, such a device could be a printer, a PDA device, or other device, which includes a slot for accepting a connector for a CompactFlash disk. It is known, for example, that many printers have a connector for a CompactFlash. Accordingly, what is needed is an active adapter, which addresses the above-identified problems.

It is also known that flash media is utilized in a variety of environments. Heretofore, the flash media is provided as a separate media to a device. In so doing, an array of different types of modules must be provided to allow for a connection to a device such as a digital camera, MP3 player or flash reader. It is desirable to provide a memory module that could be utilized with a variety of devices. The memory module must be compatible with existing standards and be capable of operating as a module.

Accordingly, what is also needed is a system and method for providing a plurality of memories to such a device without requiring multiple connectors or a controller within the memory module. The system should be cost effective, a simple modification and easily implementable into an existing device. What is further clearly needed is a controller that can work with multiple types of flash memory cards that have controllers, and also with flash memory cards that do not have controllers.

Furthermore, a controller IC, a system, and a method are needed to work with multiple types of flash memory cards that have controllers, and also with flash memory cards that do not have controllers.

SUMMARY OF THE INVENTION

A controller chip for coupling a computer system with a flash storage system is disclosed. The controller chip comprises an interface mechanism for determining whether the Flash storage system includes a controller and an adapter for providing the appropriate interface to the computer system to allow the computer system to communicate with the Flash storage system.

In a preferred embodiment, the flash storage system comprising at least a portion of a medium ID section; and a flash section, wherein the medium ID section contains specifications of the medium ID. Through the use of this system a plurality of different adapters and a flash storage system can be managed while utilizing the same hardware components.

BRIEF DESCRIPTION OF THE DRAWINGS

FIGS. 4A–4E detail detection of the type of flash-memory card by the CompactFlash reader.

FIG. 4A is an illustration of the CompactFlash reader interface in which the CE2 and CE2 pins are highlighted.

FIG. 4B illustrates a CompactFlash card inserted into the connector for card-type detection.

FIG. 4C illustrates a MultiMediaCard or Secure Digital card inserted into the connector for card-type detection.

FIG. 4D illustrates a Memory Stick card inserted into the connector for card-type detection.

FIG. 4E illustrates a SmartMedia card inserted into the connector for card-type detection.

FIG. 5 is a table of pin mappings for the SmartMedia, MMC/SD, and Memory Stick to CompactFlash adapters.

FIG. 12A illustrates the CompactFlash reader interface with the CE1 and CE2 pins highlighted.

FIG. 12B illustrates a CompactFlash card inserted into the connector for card-type detection.

FIG. 12C illustrates a MultiMediaCard or Secure Digital card inserted into the connector for card-type detection.

FIG. 12D illustrates a Memory Stick card inserted into the connector for card-type detection.

FIG. 12E illustrates a SmartMedia card inserted into the connector for card-type detection.

FIG. 18 is a table showing the translator in between the flash media and the plurality of interfaces.

FIG. 20 is a table of pin mappings for the SmartMedia, MMC/SD, and Memory Stick to CompactFlash adapters.

FIG. 23 is a table that illustrates how a particular card will be detected by a device.

FIG. 24 is a table that illustrates addressing of the SmartStack module.

FIG. 24A illustrates the relationship between SmartStack module address lines (S0 . . . S3) and their equivalent pins in a CompactFlash card.

FIG. 26 is a table that illustrates the setting of a secure area of data for the SmartStack module.

DETAILED DESCRIPTION

The present invention relates to an improvement in flash-memory card readers, and more particularly for interfacing several different types of flash memory cards to a device that includes a processor. It also relates generally to memory modules and more particularly to a memory module, which is coupled via a single connector. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Description of a Flash Reader for Reading Several Types of Flash-Memory Cards with or without a PC The inventors have realized that a universal adapter can be constructed using the CompactFlash card form factor. A reader that reads CompactFlash cards can then read any of the other flash-memory cards that plug into the CompactFlash adapter. The adapters are simple, inexpensive passive adapters without a conversion chip.

The inventors have found a pin mapping from the smaller flash-card formats to CompactFlash that allows for easy detection of the type of flash-memory card inserted into the adapter. Detection of the type of flash-memory card is thus performed automatically by electronic detection by the CompactFlash reader. The CompactFlash reader is modified to perform this card-type detection. Signal conversion such as serial-to-parallel is performed by the CompactFlash reader rather than by the adapter. Adapter costs are reduced while CompactFlash reader cost is increased only slightly. The CompactFlash reader can use a single CompactFlash slot to read multiple flash-card types, including SmartMedia, MultiMediaCard, Secure Digital, Memory Stick, and CompactFlash.

In another embodiment, the CompactFlash reader is somewhat larger, and has multiple slots. The adapter is not needed in this embodiment. Instead, a slot is provided for each of the flash-memory card formats—SmartMedia, MultiMediaCard, Secure Digital, Memory Stick, and CompactFlash. A PCMCIA slot can also be added. This Compact- Flash reader can be connected to the PC by a USB cable, or it can be located within the PC chassis.

In a third embodiment, the CompactFlash reader is a stand-alone device that can operate without a PC. A removable disk media such as a R/W CD-ROM is included. The CompactFlash reader copies images from the flash-memory card to the removable disk media. A simple interface is used; such as having the user presses a button to initiate image transfer.

Figure 1A:
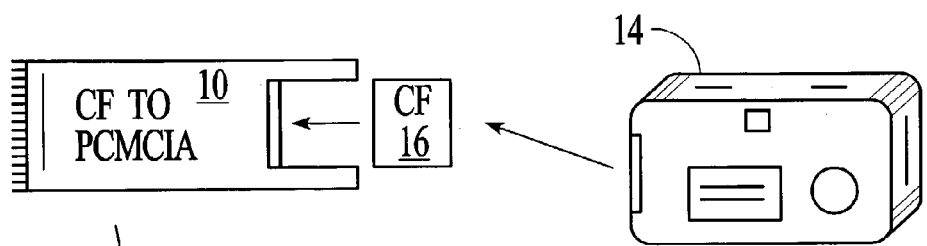
FIG. 1A shows a flash memory card and adapter for transferring images from a digital camera to a PC.
Figure 1B:
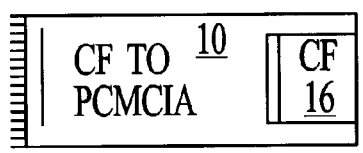
FIG. 1B shows a CF-to-PCMCIA adapter with CompactFlash card inserted.
Figure 1C:
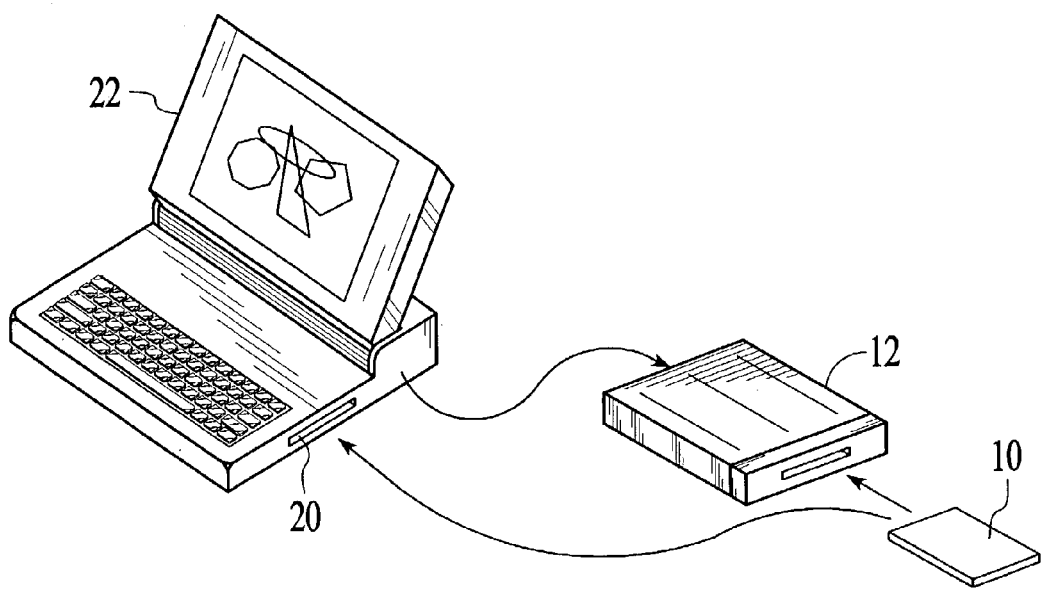
FIG. 1C shows a PC connected to a PCMCIA reader.
Figure 2A:
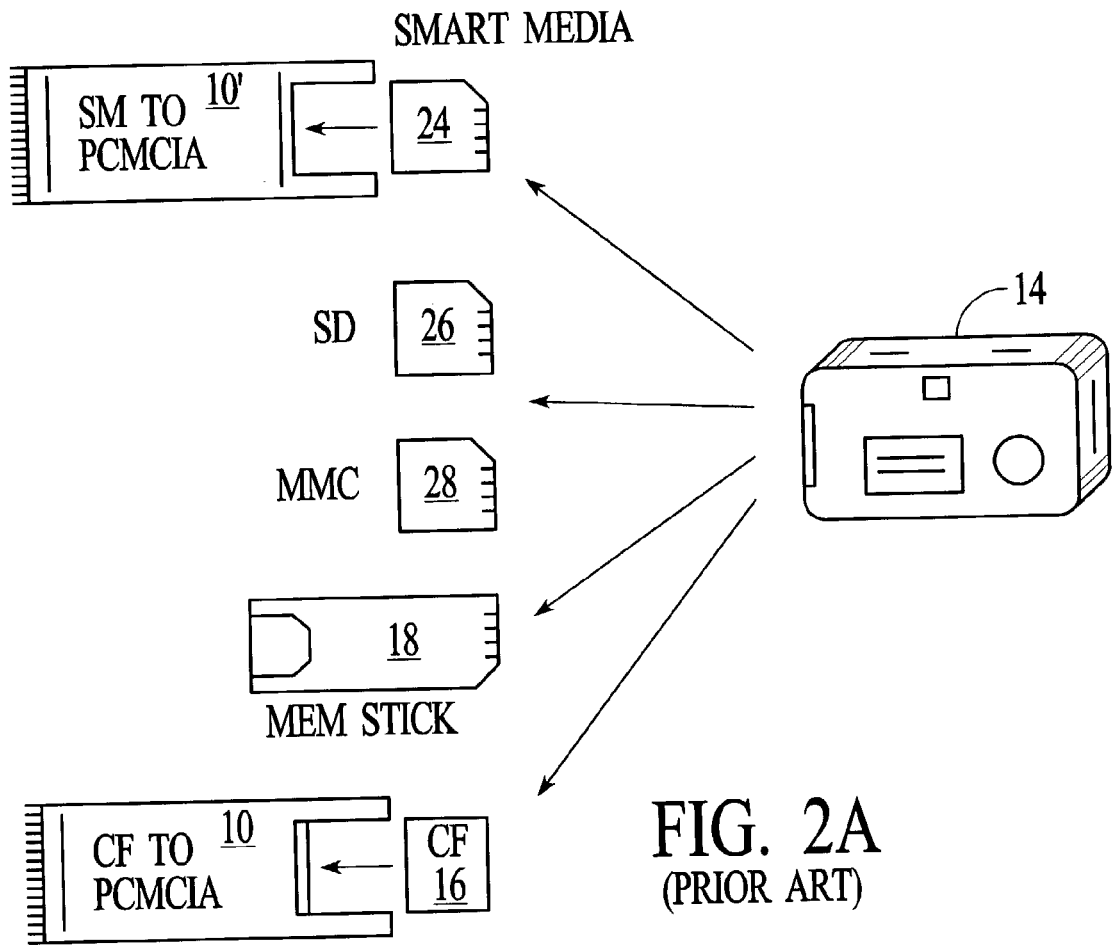
FIG. 2A illustrates various formats of flash-memory cards used with digital cameras.
Figure 2B:
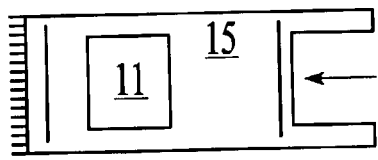
FIG. 2B shows a Memory Stick-to-PCMCIA adapter using an active converter chip 11.
Figure 2C:
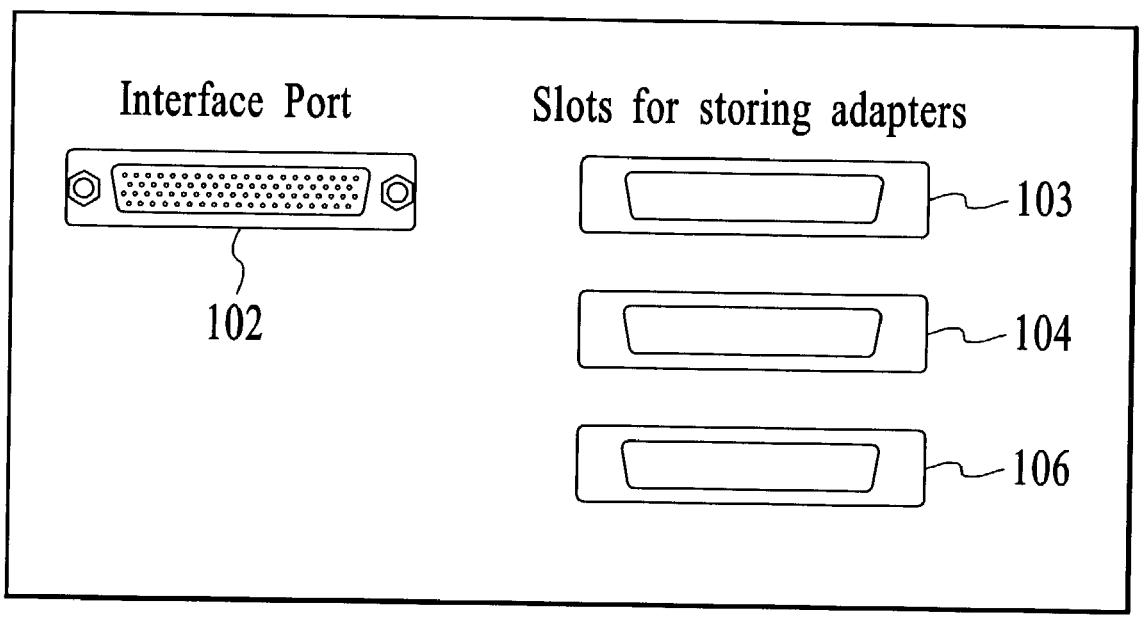
FIG. 2C illustrates a conventional bay for storing the adapters (front view).
Figure 3A:
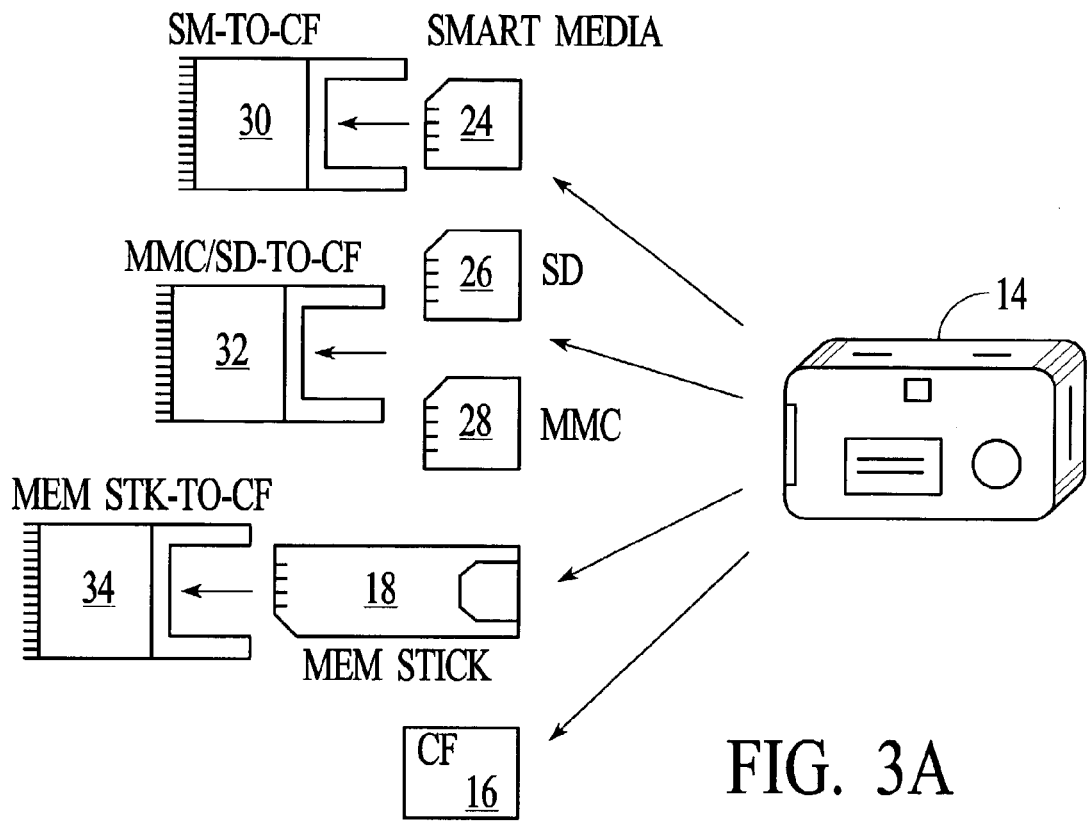
FIG. 3A shows a universal CompactFlash adapter that accepts SmartMedia, MultiMediaCard, Secure Digital, and Memory Stick flash-memory cards.
Figure 3B:
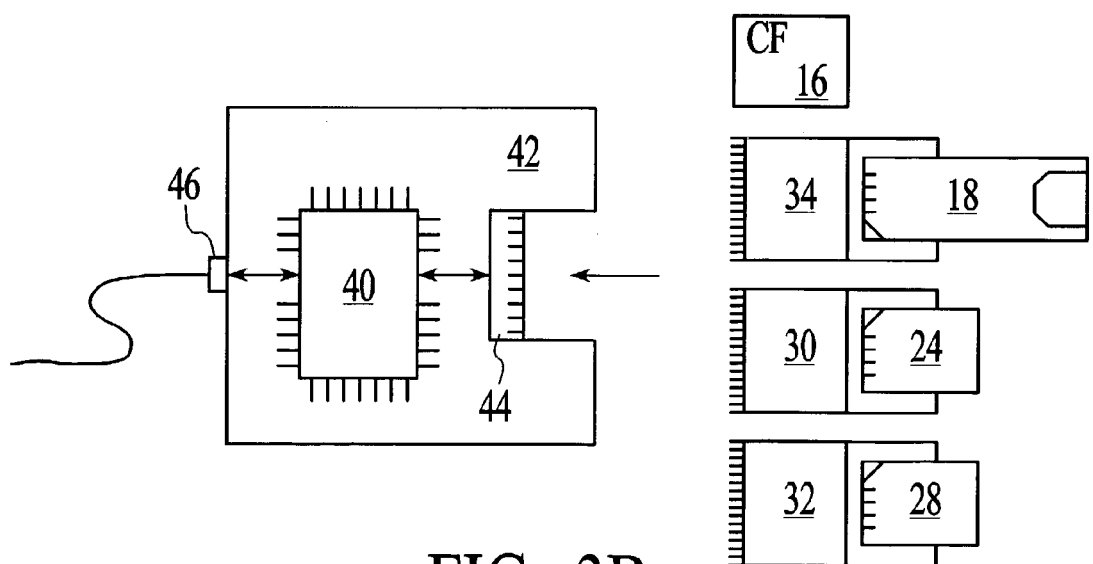
FIG. 3B shows a CompactFlash reader that reads SmartMedia, MultiMediaCard, Secure Digital, and Memory Stick flash-memory cards through passive adapters to the CompactFlash form factor.

Universal, Passive Adapters—FIGS. 3A–B

FIG. 3A shows a universal CompactFlash adapter that accepts SmartMedia, MultiMediaCard, Secure Digital, and Memory Stick flash-memory cards. Digital camera 14 stores images on flash memory that is in one of several card types. CompactFlash card 16 uses a 50-pin connector and transfers image data in a 16-bit parallel format.

SmartMedia card 24 is a smaller flash-memory card with a 22-pin interface and transfers data in an 8-bit parallel format. SmartMedia adapter 30 converts the 22-pin SmartMedia interface to fit within the 50-pin CompactFlash interface. When SmartMedia card 24 is plugged into SmartMedia adapter 30, both can be plugged into a CompactFlash slot on a CompactFlash reader. Of course, ordinary CompactFlash readers will not be able to read SmartMedia card 24 since the CompactFlash reader requires special signal conversion.

MultiMediaCard 28 and Secure Digital card 26 are flash-memory cards with similar 9-pin interfaces. Serial data transfer is used through a single Data I/O pin. MMC/SD adapter 32 has an opening with a 9-pin connector to receive either MultiMediaCard 28 or Secure Digital card 26. Once MultiMediaCard 28 or Secure Digital card 26 is inserted into MMC/SD adapter 32, then MMC/SD adapter 32 can be inserted into a CompactFlash slot on a special CompactFlash reader. The CompactFlash reader then detects the card type and performs serial-to-parallel conversion.

Memory Stick card 18 is also a flash-memory card with 10-pin, serial-data interfaces, but is narrower and longer than MultiMediaCard 28 or Secure Digital card 26. Memory Stick adapter 34 has an opening with a 10-pin connector to receive Memory Stick card 18. Once Memory Stick card 18 is inserted, Memory Stick adapter 34 can itself be inserted into a CompactFlash slot on a special CompactFlash reader. The CompactFlash reader then detects the card type and performs serial-to-parallel conversion.

FIG. 3B shows a CompactFlash reader 42 that reads SmartMedia, MultiMediaCard, Secure Digital, and Memory Stick flash-memory cards through passive adapters to the CompactFlash form factor. CompactFlash reader 42 has an opening or slot with 50-pin connector 44 that accepts CompactFlash card 16. Converter chip 40 performs handshaking with CompactFlash card 16 and performs data transfer. CompactFlash reader 42 also connects to a PC over USB connector 46. Converter chip 40 also controls the USB interface to the host PC, allowing image files to be transferred to the PC from CompactFlash card 16.

CompactFlash reader 42 can also read other kinds of flash-memory cards. For example, MemoryStick adapter 34 allows Memory Stick card 18 to be read. Memory Stick adapter 34 has an opening that Memory Stick card 18 fits into, while Memory Stick adapter 34 itself fits into 50-pin connector 44, since MemoryStick adapter 34 has the same form factor as a CompactFlash card.

SmartMedia card 24 can also be read by CompactFlash reader 42, using SmartMedia adapter 30. Likewise, MultiMediaCard 28 or Secure Digital card 26 can be read using MMC/SD adapter 32.

Adapters 30, 32, 34 are passive adapters that only connect pins from the smaller flash-memory cards to the 50-pin CompactFlash connector. An active converter chip is not required, greatly reducing cost and complexity.

Detection of Card Type—FIGS. 4A–E.

FIGS. 4A–E detail detection of the type of flash-memory card by the CompactFlash reader. Since the same CompactFlash slot is used for many kinds of flash-memory cards, a detection method is useful so that the user doesn't have to explicitly indicate what type of flash-memory card is inserted into the CompactFlash reader.

The inventors have carefully examined the pins of the interfaces to the various flash-memory cards and have discovered that type-detection can be performed by examining two pins. Pins CE1 and CE2 are the chip enable pins of the 50-pin CompactFlash interface. These pins are normally inputs to the CompactFlash card and thus are driven by the CompactFlash reader. When the reader does not drive CE1, CE2 to the inserted CompactFlash card, the CE1, CE2 pins float or are pulled high by pull-up resistors.

Address pins are not present on the other kinds of flash-memory cards. Instead, the address and data are multiplexed. For MMC/SD and Memory Stick cards, the address is sent serially. Using the adapters, pins from the other flash-memory cards can be connected to the CompactFlash pins. Pins CE1 and CE2 are used to detect the type of card. For SmartMedia cards, the addresses are sent by using a special control sequence followed by 3 or 4 bytes of starting address.

Figure 4A:
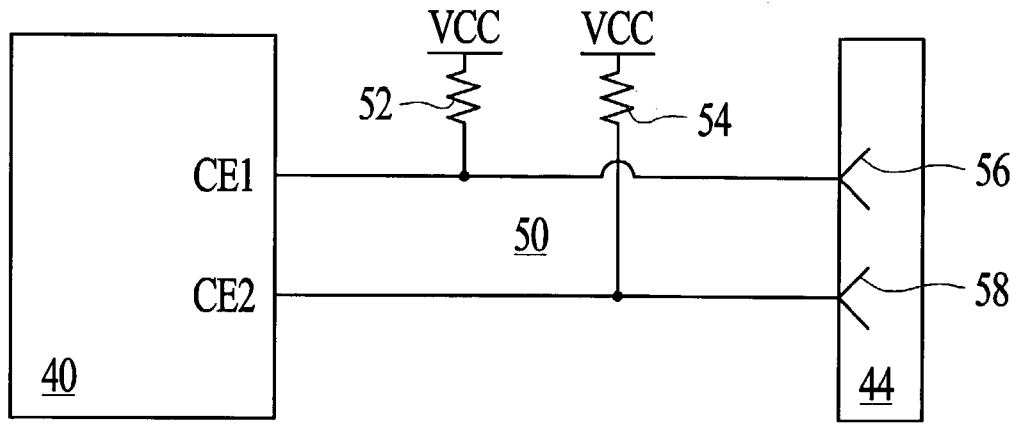

In FIG. 4A, the CE2, CE1 pins of the CompactFlash reader interface are highlighted. Converter chip 40 in the CompactFlash reader normally drives all 11 address pins in the CompactFlash interface when reading a CompactFlash card plugged into connector 44. The CE1 pin from the CompactFlash card plugs into connector cup 56, while the CE2 pin from the CompactFlash card plugs into connector cup 58 of 50-pin connector 44.

Card-type detector 50 has two pull-up resistors added to lines CE1, CE2. Resistor 52 pulls line CE1 high to power (Vcc) when neither converter chip 40 nor a card plugged into connector 44 drives line CE1. Likewise, resistor 54 pulls line CE2 high when line CE2 is not being actively driven. During detection mode, converter chip 40 is programmed to not drive lines CE1, CE2 and instead use then as inputs to the detector logic.

Figure 4B:
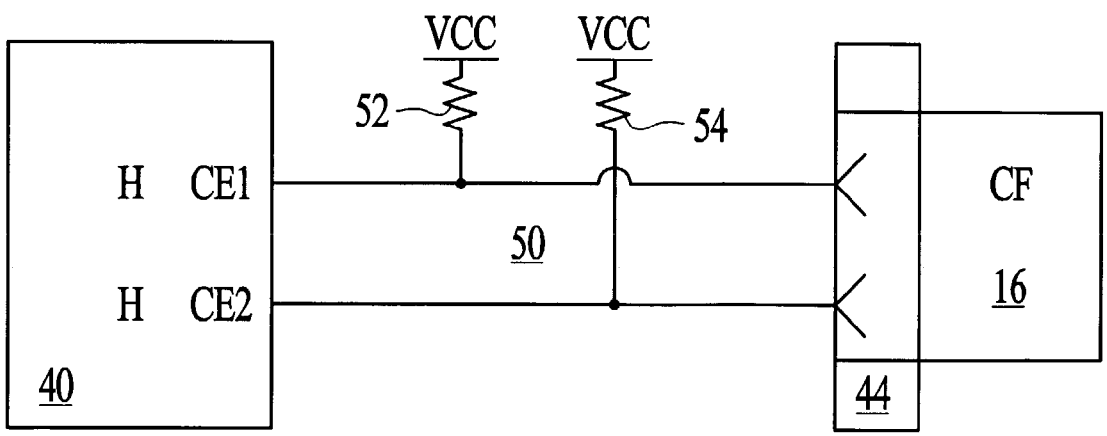

In FIG. 4B, a CompactFlash card is inserted into the connector for card-type detection. CompactFlash card 16 is plugged into connector 44. Since CE1 and CE2 are inputs to CompactFlash card 16, they are not driven by CompactFlash card 16. During detection mode, converter chip 40 also does not drive pins CE1, CE2. Thus lines CE1, CE2 are left floating and are each pulled high by resistors 52, 54.

Detection logic in converter chip 40 reads card-select pins CD0, CD1 to detect the presence of a flash-memory card. When a new card is present, detection logic then reads pins CE1, CE2 as inputs. Both inputs are high. The detection logic in converter chip 40 recognizes the HH state of CE1, CE2 as indicating that a CompactFlash card is plugged into connector 44. Converter chip 40 then exits detection mode and configures its interface to connector 44 for the 50-pin CompactFlash interface as shown later in FIG. 5.

In FIG. 4C, a MultiMediaCard or Secure Digital card is inserted into the connector for card-type detection. MMC/

SD card 28 (not shown) is plugged into MMC/SD adapter 32, which is plugged into connector 44.

Converter chip 40 does not drive pins CE1, CE1 during detection mode. Thus pin CE2 floats and is pulled high by resistor 54.

The CE1 pin is driven low by the MMC card.

Detection logic in converter chip 40 reads card-select pins CD0, CD1 to detect the presence of a flash-memory card. When a new card is present, detection logic then reads pins CE1, CE2 as inputs. While CE1 is low, CE2 is high. The detection logic in converter chip 40 recognizes the LH state of CE1, CE2 as indicating that a MMC or SD card is plugged into connector 44. Converter chip 40 then exits detection mode and configures its interface to connector 44 for the 9-pin MMC/SD interface as shown later in FIG. 5.

In FIG. 4D, a Memory Stick card is inserted into the connector for card-type detection. Memory Stick card 18 (not shown) is plugged into Memory Stick adapter 30 which is plugged into connector 44. The adapter 30 does not connect pins CE1, CE2 from the CompactFlash interface to any pins on the Memory Stick card. Adapter 30 internally connects pin CE2 from the CompactFlash interface to the ground pin on the CompactFlash interface.

The Memory Stick card does not drive either pin CE2, CE1, although adapter 34 drives pin CE2 low. Likewise, converter chip 40 does not drive pins CE2, CE1 during detection mode. Pin CE1 floats and is pulled high by resistor 52.

Detection logic in converter chip 40 reads card-select pins CD0, CD1 to detect the presence of a flash-memory card. When a new card is present, detection logic then reads pins CE1, CE2 as inputs. While CE1 is high, CE2 is low. The detection logic in converter chip 40 recognizes the HL state of CE1, CE2 as indicating that a Memory Stick card is plugged into connector 44. Converter chip 40 then exits detection mode and configures its interface to connector 44 for the Memory Stick interface as shown later in FIG. 5.

In FIG. 4E, a SmartMedia card is inserted into the connector for card-type detection. SmartMedia card 24 (not shown) is plugged into SmartMedia adapter 34, which is plugged into connector 44.

Detection logic in converter chip 40 reads card-select pins CD0, CD1 to detect the presence of a flash-memory card. When a new card is present, detection logic then reads pins CE1, CE2 as inputs. Both pins CE1, CE2 are low. The detection logic in converter chip 40 recognizes the LL state of CE1, CE2 as indicating that a SmartMedia card is plugged into connector 44.

Pin Mapping—FIG. 5

FIG. 5 is a table of pin mappings for the SmartMedia, MMC/SD, and Memory Stick to CompactFlash adapters. The pin numbers for the smaller interfaces for SmartMedia, MMC/SD, and Memory Stick are not shown but can be in any order or designation. The adapter connects the proper pin on the smaller interface to the CompactFlash pin number shown in FIG. 5. Simple wiring such as individual wires, flat cables, printed-circuit board (PCB), or wiring traces can be used.

The ground pins on the smaller interfaces are connected to CompactFlash pins 1 and 50. Power pins are connected to CompactFlash pins 13, 38. Pins 25, 26 are the card-detect signals for CompactFlash, which the adapters connect to the card-detect signals on all smaller interfaces.

The CompactFlash connectors use pins 2–6, 21–23, 27–31, and 47–49 for the 16-bit parallel data bus to the CompactFlash card. Pins 8, 10–12, and 14–20 form a separate 11-bit address bus. The separate data and address buses provide for rapid random addressing of CompactFlash cards. Other control signals include pins 6, 32 chip enables, pin 9 output enable, pin 36 write enable, interrupt pin 37, reset pin 41, and register REG pin 44. REG pin 44 is the Attribute Memory Select, defined based on the CF mode of operation, i.e. PCMCIA I/O mode, IDE or PCMCIA Memory Mode. Several pins in the 50-pin interface are not connected.

The smaller SmartMedia interface also has a parallel data bus of 8 bits. These are mapped to pins 2–6, and 21–23 of the CompactFlash interface to match the CompactFlash D0:7 signals. While no separate address bus is provided, address and data are multiplexed. Control signals for latch enables, write enable and protect, output enable, and ready handshake are among the control signals. Output enable—OE and write enable—WE are mapped to the same function pins 9, 36 of the CompactFlash interface. The total number of pins in the SmartMedia interface is 22.

The Memory Stick and MMC/SD flash-memory-card interfaces are smaller still, since parallel data or address busses are not present. Instead, serial data transfers occur through serial data pin DIO, which is mapped to pin 19 (CE2). Data is clocked in synchronization to clock SCLK on pin 18. A command signal CMD or BS occupies pin 20 (CE1). The MMC/SD and Memory Stick interfaces require only 6 pins plus power and ground.

Detection logic in converter chip 40 reads card-select pins CD0, CD1 to detect the presence of a flash-memory card. When a new card is present, detection logic then reads pins CE1, CE2 as inputs to determine the card type. The pull-up resistors of FIG. 4A together with wiring inside the adapter and the card's behavior determines whether CE1, CE2 are pulled low by the adapter or pulled high by the pull-up resistors.

Figure 6:
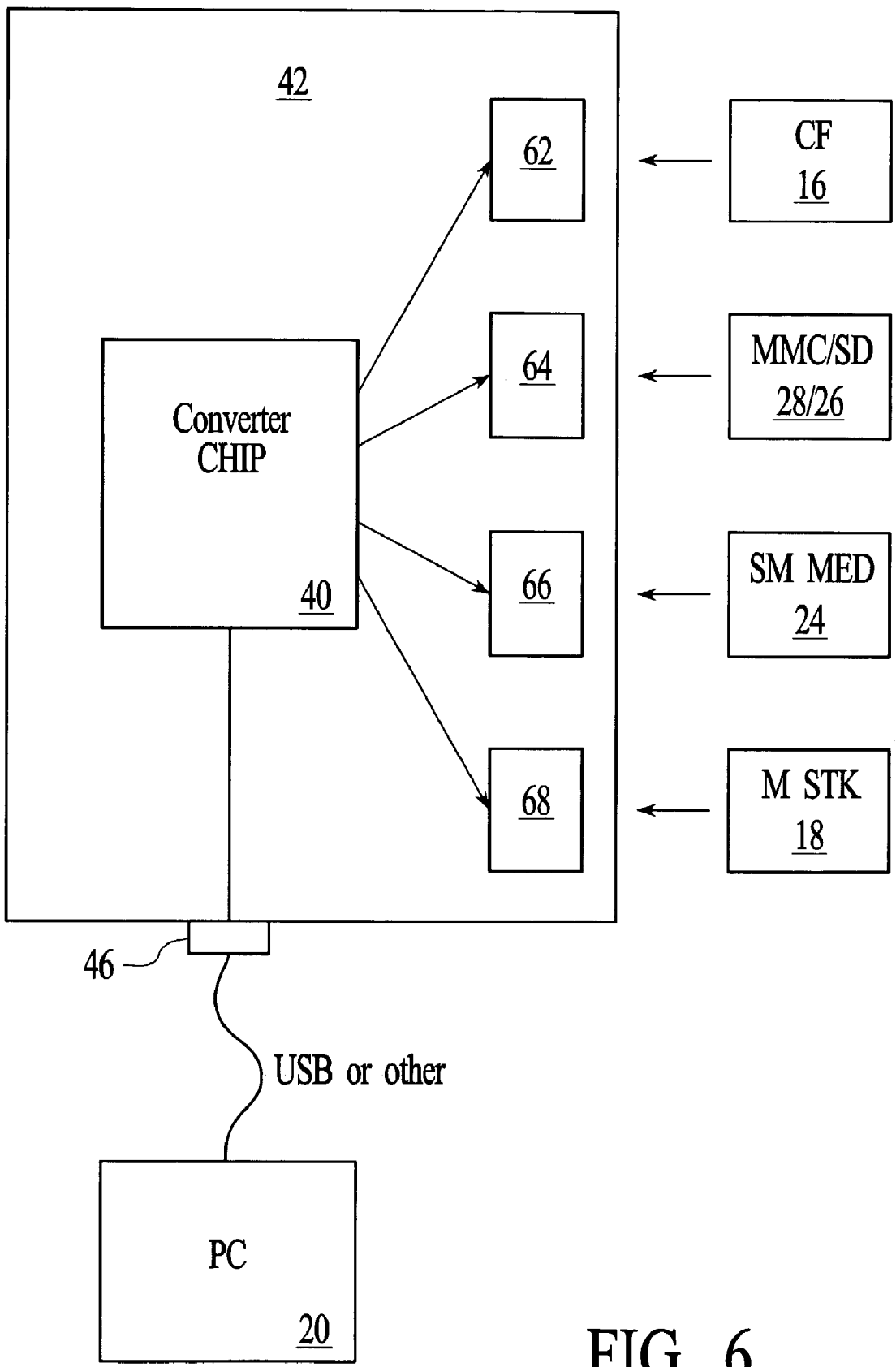
FIG. 6 is a diagram of a multi-slot embodiment of the flash-card reader.

Multi-Slot Multi-Flash-Card Reader—FIG. 6

FIG. 6 is a diagram of a multi-slot embodiment of the flash-card reader. While the single-slot embodiment of FIG. 3B results in the smallest physical design, somewhat larger flash-card readers can be made that have separate slots for each type of flash-memory card, rather than a single slot. This negates the need for the adapters or with some slots with multiple connectors.

Four connectors are provided in flash reader 42: a 50-pin CompactFlash connector 62 that fits CompactFlash card 16, a 9 pin MMC/SD connector 64 that fits MultiMediaCard 28 or a Secure Digital card 26, a 22-pin SmartMedia connector 66 that fits SmartMedia card 24, and a 10-pin Memory Stick connector 68 that fits Memory Stick card 18. Each of the four connectors 62, 64, 66, 68 route their signals to converter chip 40. Converter chip 40 detects when a flash-memory card has been inserted into one of the connectors 62, 64, 66, 68 and configures itself to read files from the inserted card using the pin interface of FIG. 5 corresponding to the card type.

Converter chip 40 executes various routines to perform handshaking with the flash-memory cards and accept data, either serially or in parallel. The data is buffered and then sent to the host PC 20 through USB connector 46. Converter chip 40 generates the appropriate USB-interface signals to transfer the data to host PC or any computing system 20.

Having separate connectors 62, 64, 66, 68 with separate slots in flash reader 42 allows for card-to-card transfers. For example, images or other files from Memory Stick card 18 could be transferred to CompactFlash card 16 by converter chip 40 reading serial data from Memory Stick card inserted into connector 68, converting to parallel, and writing to connector 62 and CompactFlash card 16. Each of the flash-memory cards in connectors 62, 64, 66, 68 can be assigned a different drive letter by the operating system, such as E:, F:, G:, and H:.

In this embodiment, flash reader 42 is contained in an external housing that connects to host PC 20 through a USB cable. Of course, other cables and interfaces such as IEEE 1394 FireWire may be substituted.

Figure 7:
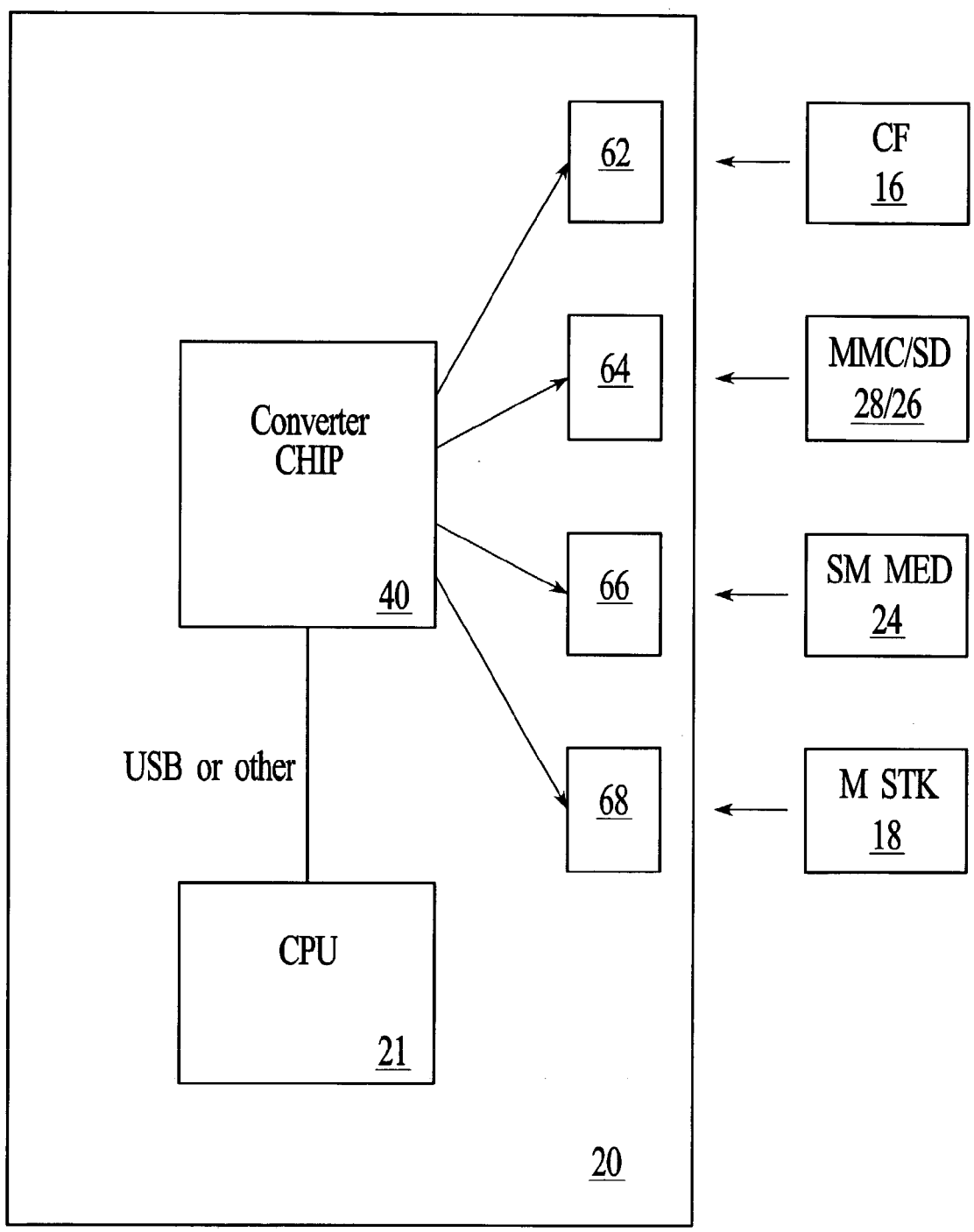
FIG. 7 shows a flash-memory reader within a PC.
Figure 8:
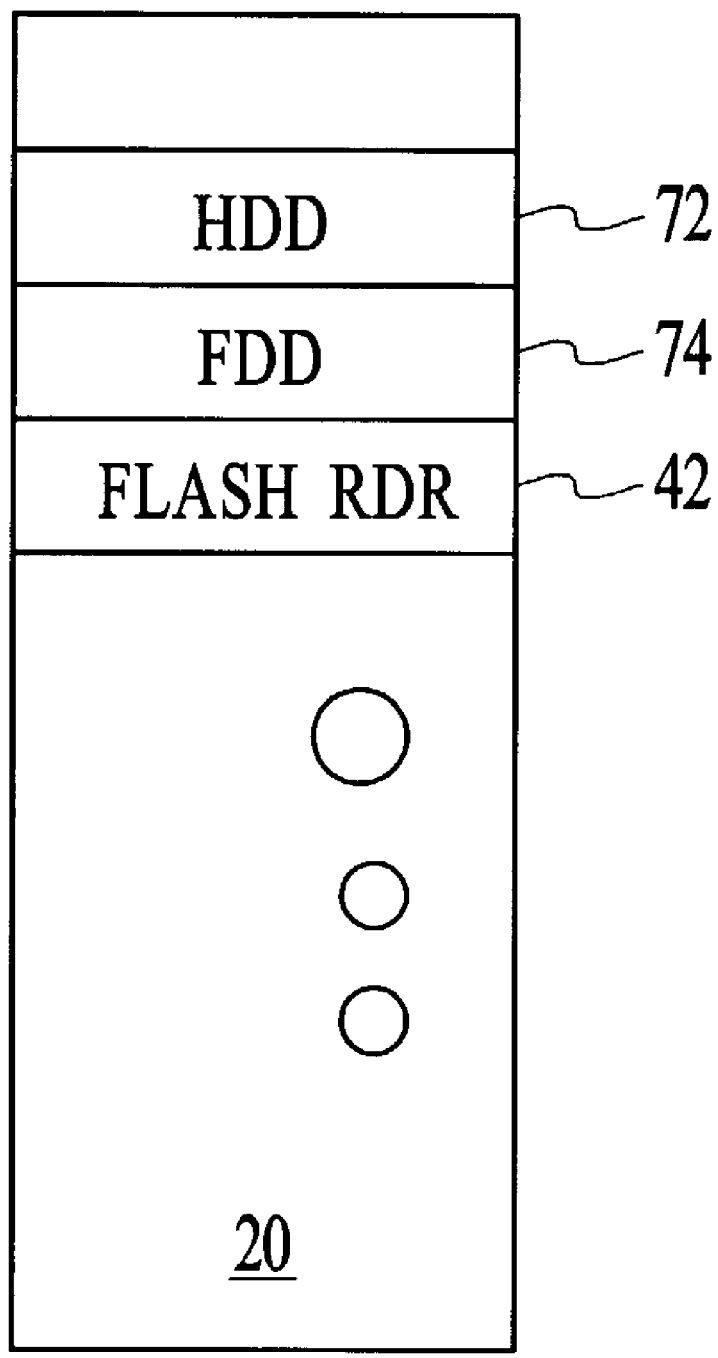
FIG. 8 shows a PC chassis with a flash-card reader in one of the drive bays.

Flash Reader Within PC—FIGS. 7–8

FIG. 7 shows a flash-memory reader within a PC. Four slots and four connectors are provided in flash reader 42. A 50-pin CompactFlash connector 62 fits CompactFlash card 16, a 9-pin MMC/SD connector 64 fits MultiMediaCard 28 or a Secure Digital card 26, a 22-pin SmartMedia connector 66 fits SmartMedia card 24, and a 10-pin Memory Stick connector 68 fits Memory Stick card 18.

Each of the four connectors 62, 64, 66, 68 route their signals to converter chip 40. Converter chip 40 detects when a flash-memory card has been inserted into one of the connectors 62, 64, 66, 68 and configures itself to read files from the inserted card using the pin interface of FIG. 5 corresponding to the card type. Each of the flash-memory cards in connectors 62, 64, 66, 68 can be assigned a different drive letter by the operating system, such as E:, F:, G:, and H:.

Converter chip 40 executes various routines to perform handshaking with the flash-memory cards and accept data, either serially or in parallel. The data is buffered and then sent to the CPU 21 in PC 20 through an internal USB bus. Converter chip 40 generates the appropriate USB-interface signals to transfer the data to CPU 21.

FIG. 8 shows a PC chassis with a flash-card reader 42 in one of the drive bays. PC 20 is enclosed by a chassis or case that has several drive bays allowing the user or manufacturer to insert peripherals such as hard and floppy disk drives, CD-ROM and DVD drives, and tape drives. HDD bay 72 contains a hard-disk drive, while FDD bay 74 contains a floppy disk drive. These are connected by cables to cards inserted into a USB, ATA, or other expansion bus connectors on the motherboard.

Flash reader 42 is inserted into one of the drive bays. The four slots face forward, allowing the user to insert flash-memory cards into flash reader 42 much as a floppy disk is inserted into the floppy-disk drive in FDD bay 74.

Flash reader 42 can be installed by the user from a kit purchased at a store, or it can be pre-installed by an original-equipment manufacturer (OEM) or retailer. The user can easily transfer digital images from a digital camera, regardless of the type of flash-card used by the camera, due to the many different formats of flash-memory cards read by flash reader 42. While Digital cameras are used as an illustration, the concept applies to movement of data.

Figure 9:
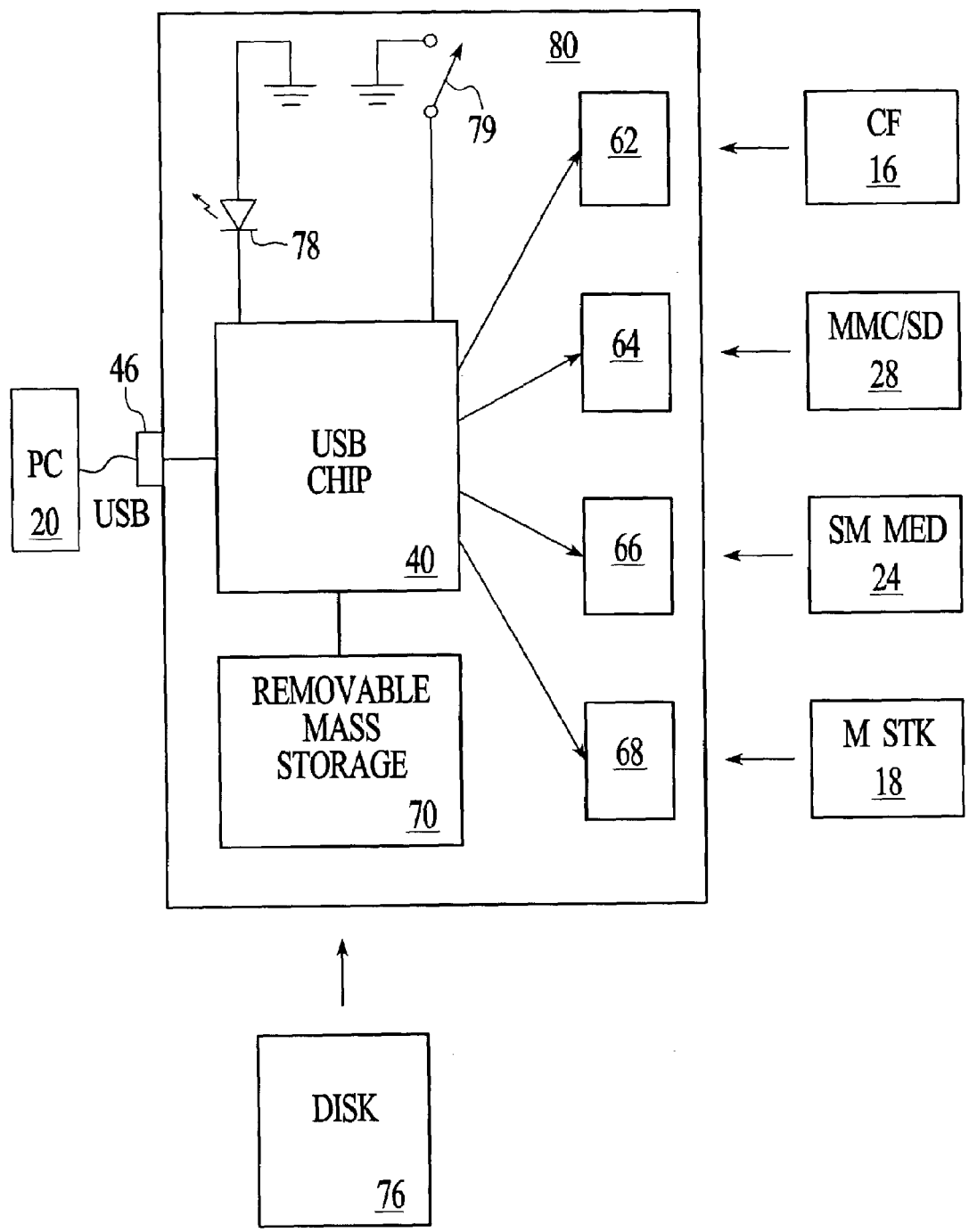
FIG. 9 is a diagram of a stand-alone flash reader that accepts several formats of flash-memory cards and can copy images to a removable disk without being connected to a host PC.

Flash Reader—FIG. 9

FIG. 9 is a diagram of a stand-alone flash reader 80 that accepts several formats of flash-memory cards and can copy images to a removable disk without being connected to a host PC. Digital photographers may not always have their PCs nearby. While extra flash-memory cards can be purchased and swapped in the digital camera, these flash-memory cards are somewhat expensive, especially when many high-resolution images are captured. Especially during a long trip away from the PC, the user may be limited by the capacity of the flash-memory cards.

Flash reader 80 has four slots and four connectors are provided in Flash reader 80. A 50-pin CompactFlash connector 62 fits CompactFlash card 16, a 9-pin MMC/SD connector 64 fits MultiMediaCard 28 or a Secure Digital card, a 22-pin SmartMedia connector 66 fits SmartMedia card 24, and a 10-pin Memory Stick connector 68 fits Memory Stick card 18.

Each of the four connectors 62, 64, 66, 68 route their signals to converter chip 40. Converter chip 40 detects when a flash-memory card has been inserted into one of the connectors 62, 64, 66, 68 by sensing card select lines CD0, CD1 and configures itself to read files from the inserted card using the pin interface of FIG. 5 corresponding to the card type.

Converter chip 40 executes various routines to perform handshaking with the flash-memory cards and accept data, either serially or in parallel. The data is buffered and then sent either to host PC 20 through USB connector 46 or to removable mass storage 70. Converter chip 40 generates the appropriate USB-interface signals to transfer the data to host PC 20. Converter chip 40 also generates the control signals for removable mass storage 70, allowing the image data read from the flash-memory card to be written to removable disk 76. Removable disk 76 could be a standard or a high-density floppy diskette, a tape drive, a write-able CD-R/W disk, or other proprietary media such as LS120 by Imation of Oakdale, Minn., or ZIP drives by Iomega Corp. of Roy, Utah.

Each of the flash-memory cards in connectors 62, 64, 66, 68 can be assigned a different drive letter by the operating system, such as E:, F:, G:, and H:. Removable mass storage 70 can also be signed a drive letter.

When Flash reader 80 is not attached to host PC 20, image files may still be copied to removable mass storage 70. Flash reader 80 may be carried along on a trip by the user, allowing the user to download image files to removable disk 76. Since removable disk 76 ordinarily has a much higher capacity than the flash-memory cards, many pictures may be captured when no access to host PC 20 is available. Flash reader 80 can be provided with battery power or with its own AC converter.

Flash reader 80 is provided with a simple user interface, including light-emitting diode LED 78 and button 79. When the user inserts a flash-memory card into one of connectors 62, 64, 66, 68, and removable disk 76 is inserted into removable mass storage 70, the user presses button 79. This activates converter chip 40, which determines which of connectors 62, 64, 66, 68 have a memory card inserted, and copies the image files to removable mass storage 70. LED 78 can be programmed to blink during the copying process, and remain lit when the copying is complete, or vice-versa. This provides a simple visual indication to the user of the copying progress. Errors can be indicated with additional LED indicator lamps, or other blinking arrangements or colors.

Figure 10:
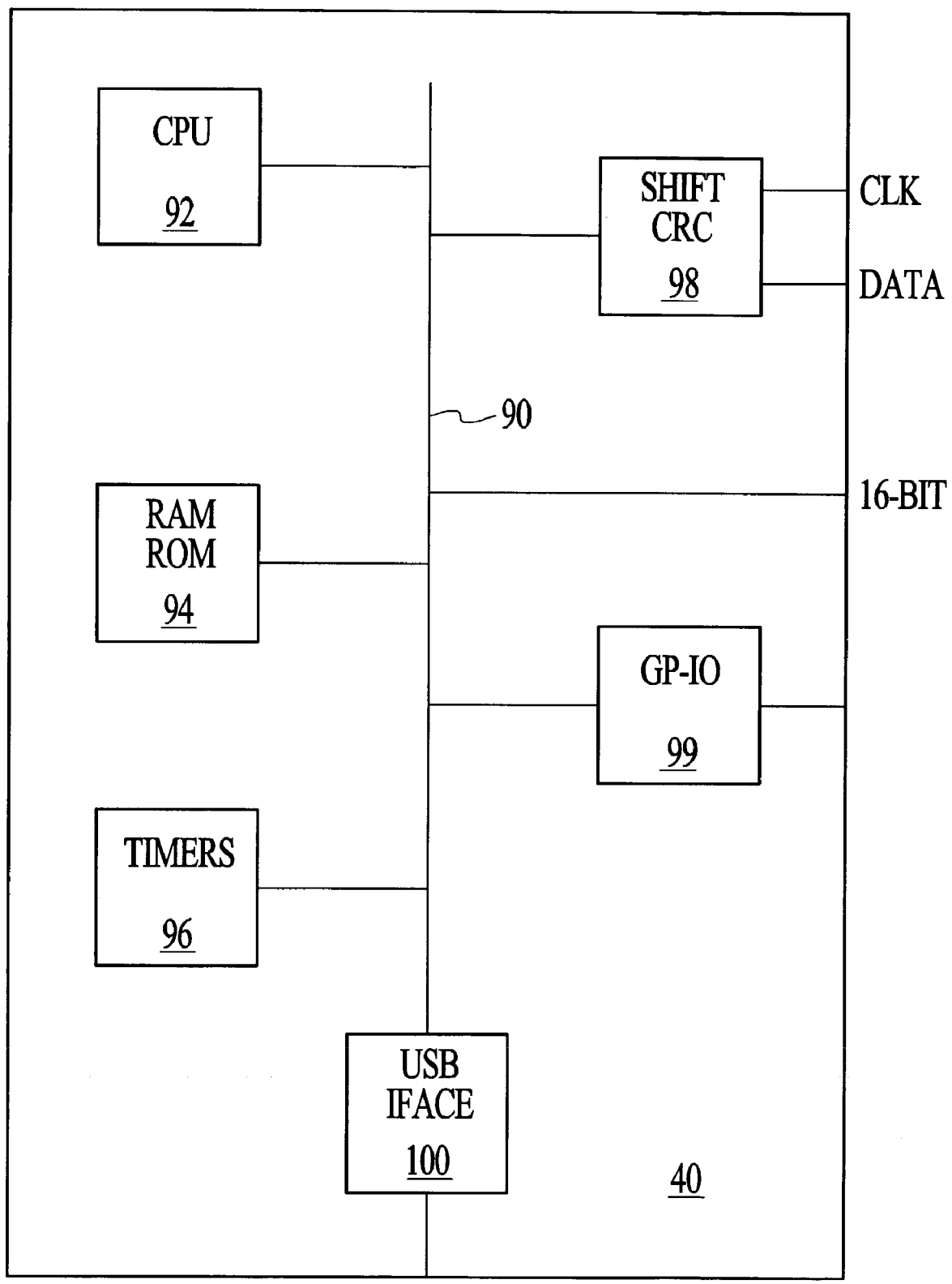
FIG. 10 is a diagram of the converter chip for the flash-memory reader.

Converter Chip—FIG. 10

FIG. 10 is a diagram of the converter chip 40 for the flash-memory reader. Converter chip 40 can be implemented as a commercially available micro-controller chip that is programmed to read and write I/O pins that are connected to the flash-memory-card connectors and USB interface. Several different control and transfer routines are written and programmed into RAM/ROM 94. CPU 92 then executes these routines. A high-level scanning routine can sense when a flash-memory card is inserted. CPU 92 can then begin execution of another routine specific to that type of flash-memory card. Transfer and handshake sub-routines can then be called.

General-purpose input-output GPIO 99 provides registers or I/O ports that drive external I/O pins of converter chip 40, or read the logic-levels or voltages on input pins to converter chip 40. CPU 92 can read registers in GPIO 99 that are written by control signals that are coupled to I/O pins of converter chip 40 from connectors 62, 64, 66, 68 (not shown). Control signals to the flash-memory cards can be switched high or low by writing a 1 or a 0 to a register for that control signal in GPIO 99.

Timers 96 are useful for asserting control signals for a required amount of time. For example, a control signal may need to be asserted for a specified number of microseconds. CPU 92 can write a 1 to a register in GPIO 99 and start a timer in timers 96. Timer 6 can send an interrupt to CPU 96 when the specified time has elapsed, or CPU 92 can continuously or periodically poll timers 96 to determine when the specified time has elapsed. Then CPU 92 can write a 0 to the register in GPIO 99, causing the control signal to transition from 1 to 0.

Shifter 98 is connected to the data and clock signals from connectors 64, 68. When data is read from the flash-memory card, a clock is pulsed to synchronize the data transfer. Shifter 98 clocks in one bit (serial) or word (parallel) of data for each clock pulse.

A cyclical-redundancy-check (CRC) can be performed on the data to detect errors. CPU 92 can request re-transmission of data from the flash-memory card when an error is detected.

Data read by shifter 98 can be sent over internal bus 90 to be stored in a buffer in RAM/ROM 94. Later, CPU 92 can execute a routine to transfer this data from RAM/ROM 94 to USB interface 100. USB interface 100 then transmits the data over an external USB link to a host PC. When a removable mass storage is present, some of the I/O pins from GPIO 99 can connect to the removable mass storage, or a separate disk controller can be included on converter chip 40.

Advantages of a Flash Reader for Reading Several Types of Flash-Memory Cards with or without a PC A universal adapter for flash-memory cards accepts cards of several different formats. The adapter accepts SmartMedia, MultiMediaCard, Secure Digital, and Memory Stick cards. The flash-card reader with a single slot accepts any format card using the adapter. Special detection logic on the flash reader distinguishes between the many flash-card formats. The low-cost passive adapter does not need an expensive converter chip. A multi-format reader is ideal for use with a PC. However, a stand-alone flash reader can copy image files from flash cards without a PC. Additionally, preparation of media for use in devices (format and erase operations) can be done using this reader.

A universal adapter is constructed using the Compact-Flash card form factor. A reader that reads CompactFlash cards can then read any of the other flash-memory cards that plug into the CompactFlash adapter. The adapters are simple, inexpensive passive adapters without a conversion chip.

The disclosed pin mapping from the smaller flash-card formats to CompactFlash allows for easy detection of the type of flash-memory card inserted into the adapter. Detection of the type of flash-memory card is thus performed automatically by electronic detection by the CompactFlash reader. The CompactFlash reader is modified to perform this card-type detection. Signal conversion such as serial-to-parallel is performed by the CompactFlash reader rather than by the adapter. Adapter costs are reduced while Compact-Flash reader cost is increased only slightly. The CompactFlash reader can use a single CompactFlash slot to read multiple flash-card types, including SmartMedia, MultiMediaCard, Secure Digital, Memory Stick, and CompactFlash.

Alternate Embodiments of a Flash Reader for Reading Several Types of Flash-Memory Cards with or without a PC Several other embodiments are contemplated by the inventors. Different flash-card formats can be supported such as Smart Cards, and more or less than the four slots shown in the multi-card flash reader can be included. Other adapters can be used for newer flash formats for the single-slot CompactFlash reader. Any device that needs Control Bus, Clock, Data Bus and Address Bus can be designed to fit into this slot. Examples of such devices include (but are not limited to) DSL Modems, Fingerprint security devices, Miniature Hard disks, etc.

While the invention has been described as connecting to a personal computer PC host, the host may also be an Apple computer such as the iMAC or G3. The host may also be a SUN computer, or any host computer using USB or IDE interfaces. The invention can also apply to Personal Digital Assistants (PDAs) such as by Palm Computer or other handheld appliances, such as a Cell phone with USB capability.

The term "CompactFlash reader" has been used for simplicity, since digital images are often read from the flash-memory card and then written to the PC. However, the CompactFlash reader is capable of reading files from the PC or from another flash-memory card and writing the file to the flash-memory card. Thus the CompactFlash reader is really a reader/writer.

In another embodiment, the CompactFlash reader is somewhat larger, and has multiple slots. The adapter is not needed in this embodiment. Instead, a slot is provided for each of the flash-memory card formats—SmartMedia, MultiMediaCard, Secure Digital, Memory Stick, and CompactFlash. A PCMCIA slot can also be added. This CompactFlash reader can be connected to the PC by a USB cable, or it can be located within the PC chassis.

In a third embodiment, the CompactFlash reader is a stand-alone device that can operate without a PC. A removable disk media such as a R/W CD-ROM is included. The CompactFlash reader copies images from the flash-memory card to the removable disk media. A simple interface is used; such as having the user presses a button to initiate image transfer. Additionally a display of the file copy process can be done on a display device such as an LCD screen. The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

Description of Improved Flash Reader for Reading Several Types of Flash-Memory Cards with or without a PC A universal adapter was disclosed that can be constructed using the CompactFlash card form factor. A reader that reads CompactFlash cards can then read any of the other flash-memory cards that plug into the CompactFlash adapter. The adapters are simple, inexpensive passive adapters without a conversion chip.

Although the above-identified compact flash reader operates effectively for its stated purpose, it cannot be utilized with an Integrated Devices Electronics (IDE) interface effectively in certain circumstances. It is desirable that a compact flash reader be utilized with an IDE interface for several reasons. Firstly, the IDE interface is a proven interface and an easy interface to design to, for devices such as digital cameras, printers, etc., which may want to embed this chip in their devices. Secondly, the IDE interface is extremely fast and will boost the transfer rates of the devices. IDE ports are freely available on most systems (since only 2 or at the most 3 of the total of 4 IDE ports are used up). Finally, attaching to the front panel of an IDE interface is possible for 100% of all PCs/Macs, etc., whereas an internal expansion slot for USB is utilized in many newer systems.

A system and method in accordance with the present invention allows an IDE interface to replace the USB interface. This will allow a flash reader to be built that could be put into the front panel of a PC in a manner that is similar to placing a CDROM into the front panel. To further describe the features of the present invention, refer now to the following description.

Universal, Passive Adapters

Figure 11:
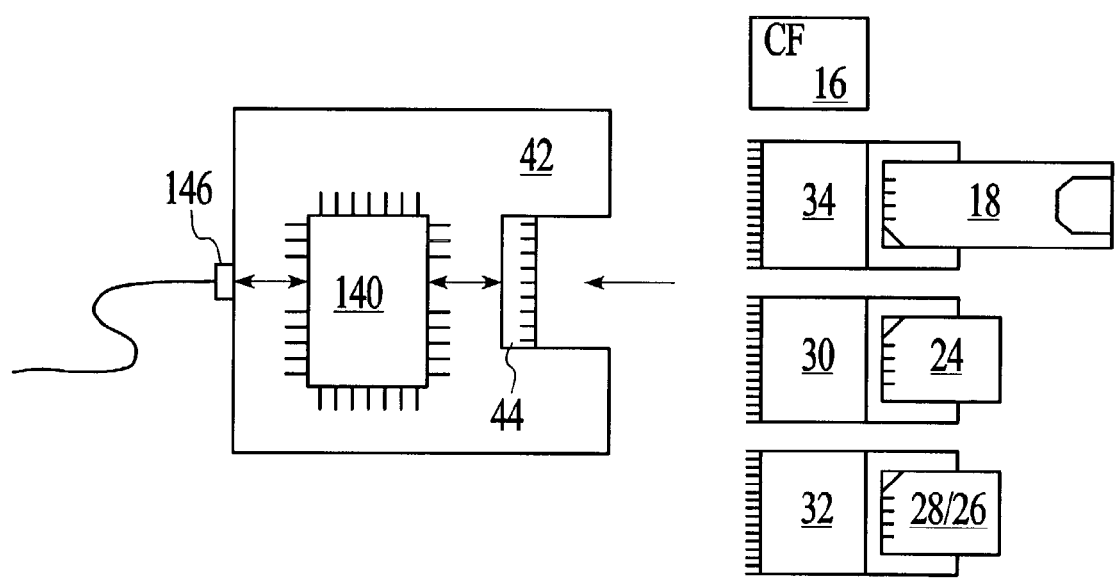
FIG. 11 shows a CompactFlash reader that reads SmartMedia, MultiMediaCard, Secure Digital, and Memory Stick flash-memory cards through passive IDE adapters to the CompactFlash form factor.

FIG. 11 shows a CompactFlash reader that reads Smart-Media, MultiMediaCard, Secure Digital, and Memory Stick flash-memory cards through passive IDE adapters to the CompactFlash form factor. CompactFlash reader 42 has an opening or slot with 50-pin connector 44 that accepts CompactFlash card 16. An IDE converter chip 140 performs handshaking with CompactFlash card 16 and performs data transfer. CompactFlash reader 42 also connects to a PC over IDE connector 146. The IDE converter chip 140 also controls the IDE interface to the host PC, allowing image files to be transferred to the PC from CompactFlash card 16.

Other kinds of flash-memory cards can also be read by CompactFlash reader 42. For example, MemoryStick adapter 34 allows Memory Stick card 18 to be read. Memory Stick adapter 34 has an opening that Memory Stick card 18 fits into, while Memory Stick adapter 34 itself fits into 50-pin connector 44, since adapter 34 has the same form factor as a CompactFlash card.

SmartMedia card 24 can also be read by CompactFlash reader 42, using SmartMedia adapter 30. Likewise, MultiMediaCard 28 or Secure Digital card 26 can be read using MMC/SD adapter 32.

Adapters 30, 32, 34 are passive adapters that only connect pins from the smaller flash-memory cards to the 50-pin CompactFlash connector. An active converter chip is not required, greatly reducing cost and complexity.

Detection of Card Type

FIGS. 12A–E detail detection of the type of flash-memory card by the CompactFlash reader. Since the same CompactFlash slot is used for many kinds of flash-memory cards, a detection method is useful so that the user doesn't have to explicitly indicate what type of flash-memory card is inserted into the CompactFlash reader.

The inventors have carefully examined the pins of the interfaces to the various flash-memory cards and have discovered that type-detection can be performed by examining two pins. Pins CE1 and CE2 are the chip enable pins for addressing the 50-pin CompactFlash interface. These pins are normally inputs to the CompactFlash card and thus are driven by the CompactFlash reader. When the reader does not drive CE1, CE2 to the inserted CompactFlash card, the CE1, CE2 pins float or are pulled high by pull-up resistors.

Address pins are not present on the other kinds of flash-memory cards. Instead, the address and data are multiplexed. For MMC/SD and Memory Stick, the address is sent serially. Using the adapters, pins from the other flash-memory cards can be connected to the CompactFlash pins. Pins CE1 and CE2 are used to detect the type of card. For SmartMedia, the addresses are sent by using a special control sequence followed by 3 or 4 bytes of starting address.

Figure 12A:
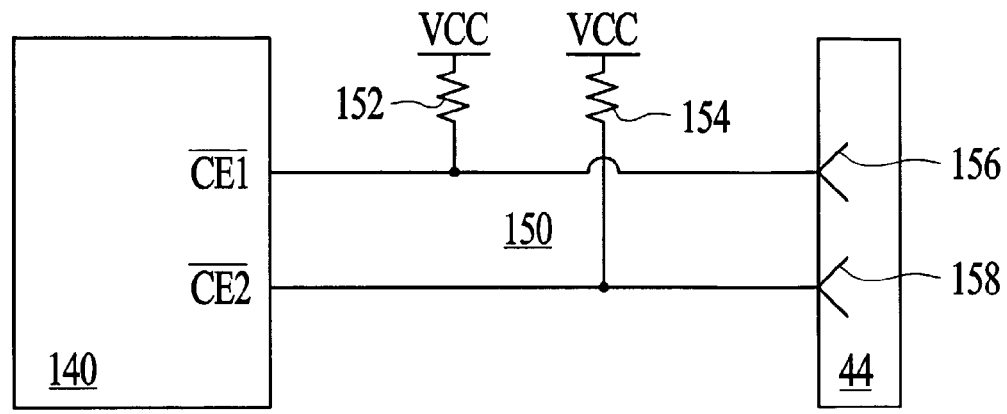
FIGS. 12A–12E detail detection of the type of flash-memory card by the CompactFlash reader.

In FIG. 12A, the CE1, CE2 pins of the CompactFlash reader interface are highlighted. The IDE converter chip 140 in the CompactFlash reader normally drives all 11 address pins in the CompactFlash interface when reading a CompactFlash card plugged into connector 44. The CE1 pin from the CompactFlash card plugs into connector cup 156, while the CE2 pin from the CompactFlash card plugs into connector cup 158 of 50-pin connector 44.

Card-type detector 150 has two pull-up resistors added to lines CE1, CE2. Resistor 152 pulls line CE1 high to power (Vcc) when neither the IDE converter chip 140 nor a card plugged into connector 44 drives line CE1. Likewise, resistor 154 pulls line CE2 high when line CE2 is not being actively driven. During detection mode, the IDE converter chip 140 is programmed to not drive lines CE1, CE2 and instead use then as inputs to the detector logic.

Figure 12B:
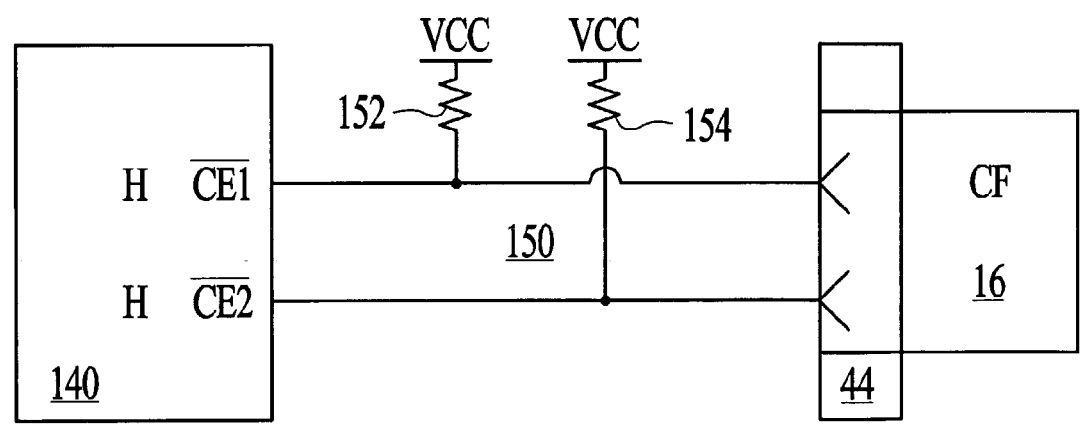

In FIG. 12B, a CompactFlash card is inserted into the connector for card-type detection. CompactFlash card 16 is plugged into connector 44. Since CE1 and CE2 are inputs to CompactFlash card 16, they are not driven by CompactFlash card 16. During detection mode, the IDE converter chip 140 also does not drive pins CE1, CE2. Thus lines CE1, CE2 are left floating and are each pulled high by resistors 152, 154.

Detection logic in the IDE converter chip 140 reads card-select pins CD0, CD1 to detect the presence of a flash-memory card. When a new card is present, detection logic then reads pins CE1, CE2 as inputs. Both inputs are high. The detection logic in the IDE converter chip 140 recognizes the HH state of CE1, CE2 as indicating that a CompactFlash card is plugged into connector 44. The IDE converter chip 140 then exits detection mode and configures its interface to connector 44 for the 50-pin CompactFlash interface as shown in FIG. 5.

Figure 12C:
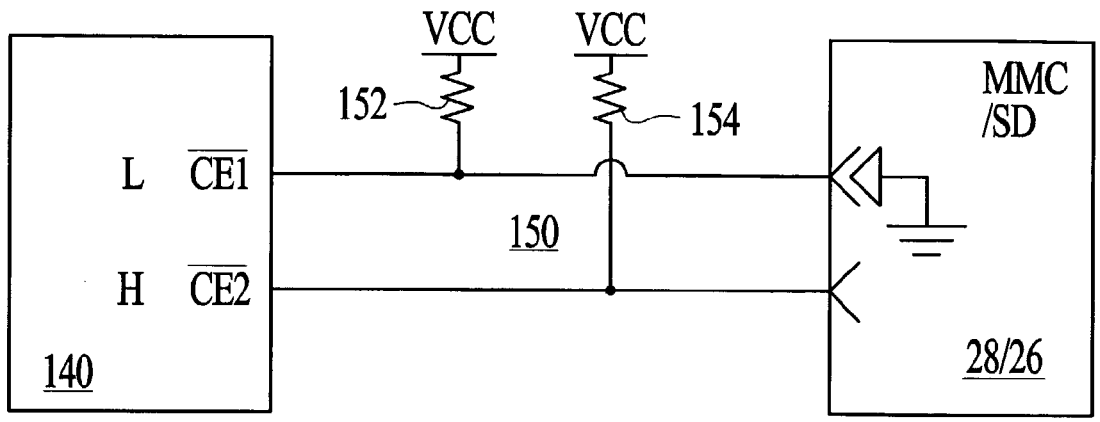

In FIG. 12C, a MultiMediaCard or Secure Digital card is inserted into the connector for card-type detection. MultiMediaCard 28 (not shown) and Secure Digital card 26 (not shown) are plugged into MMC/SD adapter 32 which is plugged into connector 44 (not shown).

The IDE converter chip 140 does not drive pins CE2, CE1 during detection mode. Thus pin CE2 floats and is pulled high by resistor 154. The CE1 pin is driven low by the MMC card.

Detection logic in the IDE converter chip 140 reads card-select pins CD0, CD1 to detect the presence of a flash-memory card. When a new card is present, detection logic then reads pins CE1, CE2 as inputs. While CE1 is low, CE2 is high. The detection logic in the IDE converter chip 140 recognizes the LH state of CE1, CE2 as indicating that a MMC or SD card is plugged into connector 44. The IDE converter chip 140 then exits detection mode and configures its interface to connector 44 for the 9-pin MMC/SD interface as shown in FIG. 5.

Figure 12D:
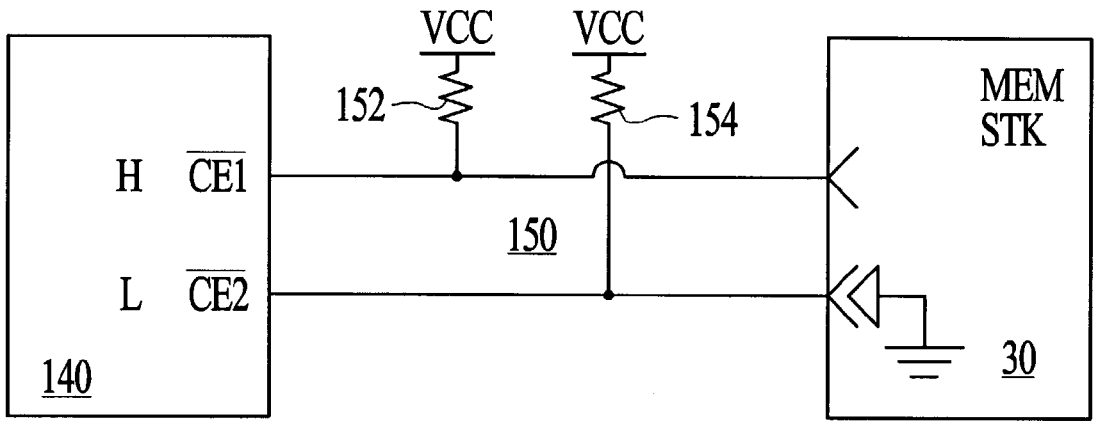

In FIG. 12D, a Memory Stick card is inserted into the connector for card-type detection. Memory Stick card 18 (not shown) is plugged into Memory Stick adapter 34 which is plugged into connector 44. The adapter 34 does not connect pins CE1, CE2 from the CompactFlash interface to any pins on the Memory Stick card. Adapter 34 internally connects pin CE2 from the CompactFlash interface to the ground pin on the CompactFlash interface.

The Memory Stick card does not drive either pin CE2, CE1, although adapter 34 drives pin CE2 low. Likewise, the IDE converter chip 140 does not drive pins CE2, CE1 during detection mode. Pin CE1 floats and is pulled high by resistor 152.

Detection logic in the IDE converter chip 140 reads card-select pins CD0, CD1 to detect the presence of a flash-memory card. When a new card is present, detection logic then reads pins CE1, CE2 as inputs. While CE1 is high, CE2 is low. The detection logic in the IDE converter chip 140 recognizes the HL state of CE1, CE2 as indicating that a Memory Stick card is plugged into connector 44. The IDE converter chip 140 then exits detection mode and configures its interface to connector 44 for the Memory Stick interface as shown in FIG. 5.

Figure 12E:
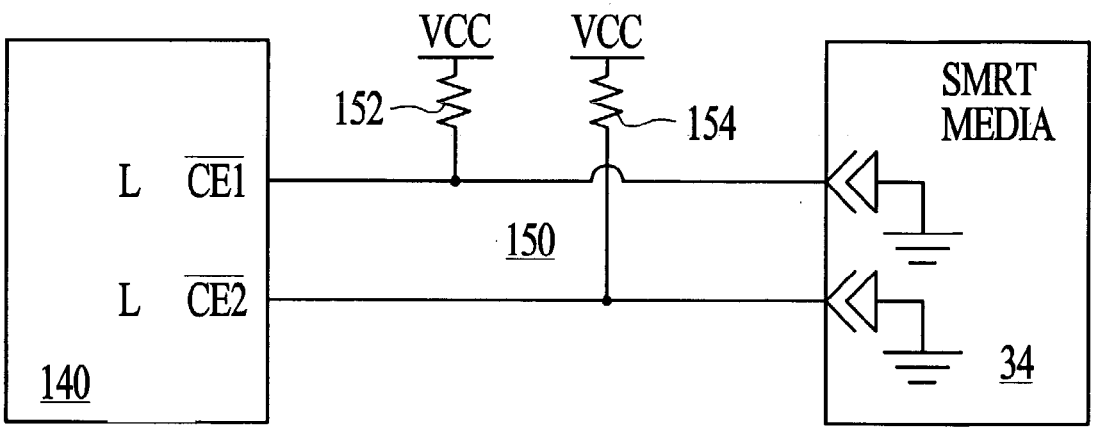

In FIG. 12E, a SmartMedia card is inserted into the connector for card-type detection. SmartMedia card 24 (not shown) is plugged into SmartMedia adapter 30, which is plugged into connector 44.

Detection logic in the IDE converter chip 140 reads card-select pins CD0, CD1 to detect the presence of a flash-memory card. When a new card is present, detection logic then reads pins CE1, CE2 as inputs. Both pins CE1, CE2 are low. The detection logic in the IDE converter chip 140 recognizes the LL state of CE1, CE2 as indicating that a SmartMedia card is plugged into connector 44. Again, this mapping shall be exemplary only, and many variations may be used instead, without departing from the spirit of the invention.

Pin Mapping

Referring back to FIG. 5, a table of pin mappings for the SmartMedia, MMC/SD, and Memory Stick to Compact-Flash adapters is shown. The pin numbers for the smaller interfaces for SmartMedia, MMC/SD, and Memory Stick are not shown but can be in any order or designation. The adapter connects the proper pin on the smaller interface to the CompactFlash pin number shown in FIG. 5. Simple wiring such as individual wires, flat cables, printed-circuit board (PCB), or wiring traces can be used.

The ground pins on the smaller interfaces are connected to CompactFlash pins 1 and 50. Power pins are connected to CompactFlash pins 13, 38. Pins 25, 26 are the card detect signals for CompactFlash, which the adapters connect to the card-detect signals on all smaller interfaces.

The CompactFlash connectors use pins 2–6, 21–23, 27–31, and 47–49 for the 16-bit parallel data bus to the CompactFlash card. Pins 8, 10–12, and 10–20 form a separate 11-bit address bus. The separate data and address buses provide for rapid random addressing of CompactFlash cards. Other control signals include pins 6, 32 chip enables, pin 9 output enable, pin 36 write enable, interrupt pin 37, reset pin 41, and register REG pin 44. REG pin 44 is the Attribute Memory Select, defined based on the CF mode of operation, i.e. PCMCIA I/O mode, IDE or PCMCIA Memory Mode. Several pins in the 50-pin interface are not connected.

The smaller SmartMedia interface also has a parallel data bus of 8 bits. These are mapped to pins 2–6, and 21–23 of the CompactFlash interface to match the CompactFlash D0:7 signals. While no separate address bus is provided, address and data are multiplexed. Control signals for latch enables, write enable and protect, output enable, and ready handshake are among the control signals. Output Enable (OE) and Write Enable (WE) are mapped to the same function pins 9, pin 36 of the CompactFlash interface. The total number of pins in the SmartMedia interface is 22.

The Memory Stick and MMC/SD flash-memory-card interfaces are smaller still, since parallel data or address busses are not present. Instead, serial data transfers occur through serial data pin DATAIO, which is mapped to pin 19 (A1 Data is clocked in synchronization to clock SERCLK on pin 18. A command signal CMD or BITSET occupies pin 20 (A0). The MMC/SD and Memory Stick interfaces require only 6 pins plus power and ground. Others are unused.

Detection logic in the IDE converter chip 140 reads card-select pins CD0, CD1 to detect the presence of a flash-memory card. When a new card is present, detection logic then reads pins CE1, CE2 as inputs to determine the card type. The pull-up resistors of FIG. 12A together with wiring inside the adapter and the card's behavior determines whether CE1, CE2 are pulled low by the adapter or pulled high by the pull-up resistors.

Multi-Slot Multi-Flash-Card Reader

Figure 13:
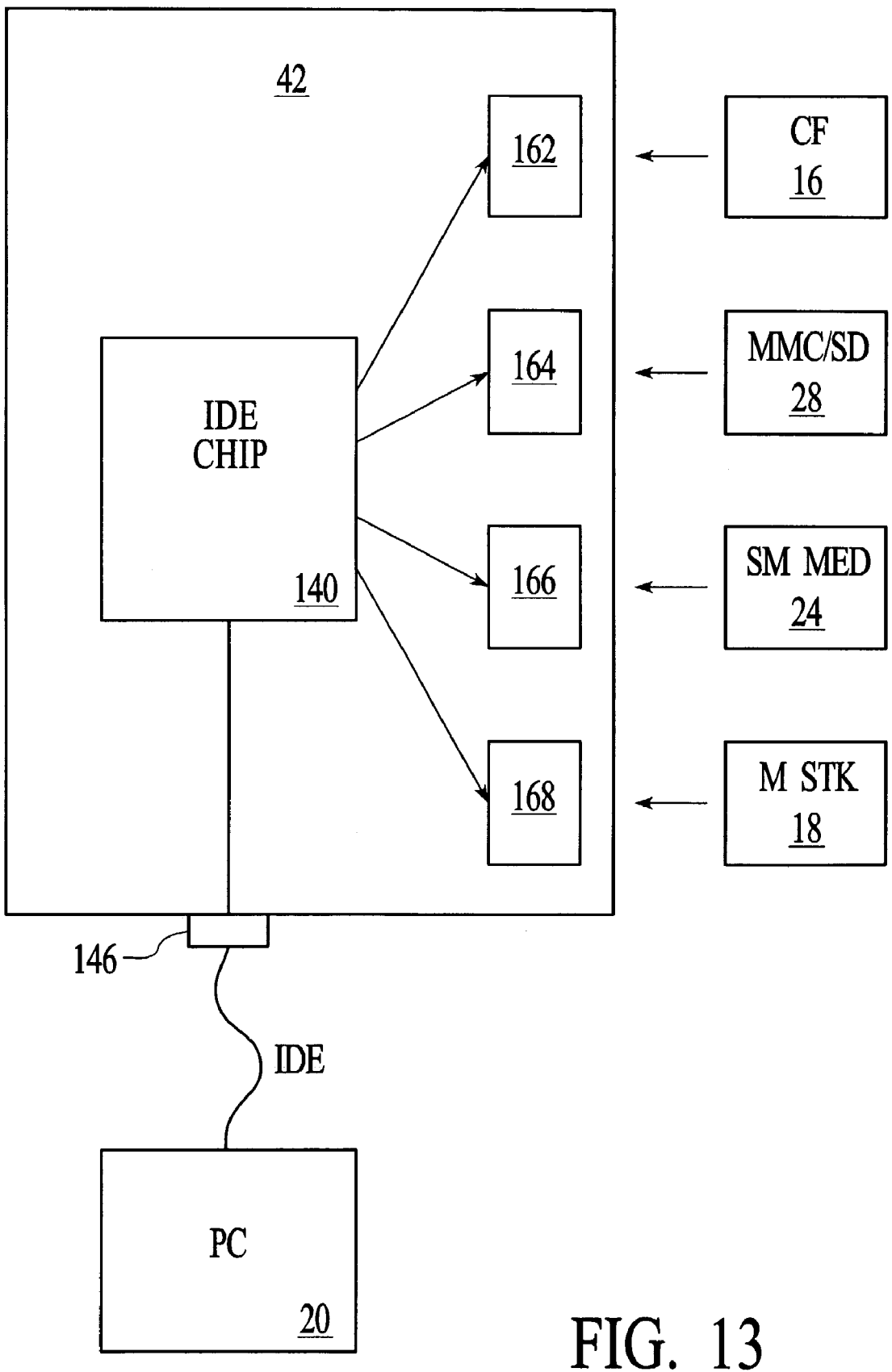
FIG. 13 is a diagram of a multi-slot embodiment of the flash-card reader, which utilizes the IDE converter chip.

FIG. 13 is a diagram of a multi-slot embodiment of the flash-card reader, which utilizes the IDE converter chip. While the single-slot embodiment of FIG. 11 results in the smallest physical design, somewhat larger flash-card readers can be made that have separate slots for each type of flash-memory card, rather than a single slot. This negates the need for the adapters.

Four connectors are provided in flash reader 42: a 50-pin CompactFlash connector 162 that fits CompactFlash card 16, a 9 pin MMC/SD connector 164 that fits MultiMediaCard 28 or a Secure Digital card, a 22-pin SmartMedia connector 166 that fits SmartMedia card 24, and a 10-pin Memory Stick connector 168 that fits Memory Stick card 18.

Each of the four connectors 162, 164, 166, 168 route their signals to the IDE converter chip 140. The IDE converter chip 140 detects when a flash-memory card has been inserted into one of the connectors 162, 164, 166, 168 and configures itself to read files from the inserted card using the pin interface of FIG. 5 corresponding to the card type.

The IDE converter chip 140 executes various routines to perform handshaking with the flash-memory cards and accept data, either serially or in parallel. The data is buffered and then sent to the host PC 20 through IDE connector 146. The IDE converter chip 140 generates the appropriate IDE-interface signals to transfer the data to host PC 20.

Having separate connectors 162, 164, 166, 168 with separate slots in flash reader 42 allows for card-to-card transfers. For example, images or other files from Memory Stick card 18 could be transferred to CompactFlash card 16 by the IDE converter chip 140 reading serial data from Memory Stick inserted into connector 168, converting to parallel, and writing to connector 162 and CompactFlash card 16. Each of the flash-memory cards in connectors 162, 164, 166, 168 can be assigned a different drive letter by the operating system, such as E:, F:, G:, and H:.

In this embodiment, flash reader 42 is contained in an external housing that connects to host PC 20 through an IDE cable. Of course, other cables and interfaces such as IEEE 1394 FireWire may be substituted.

Flash Reader within PC

Figure 14:
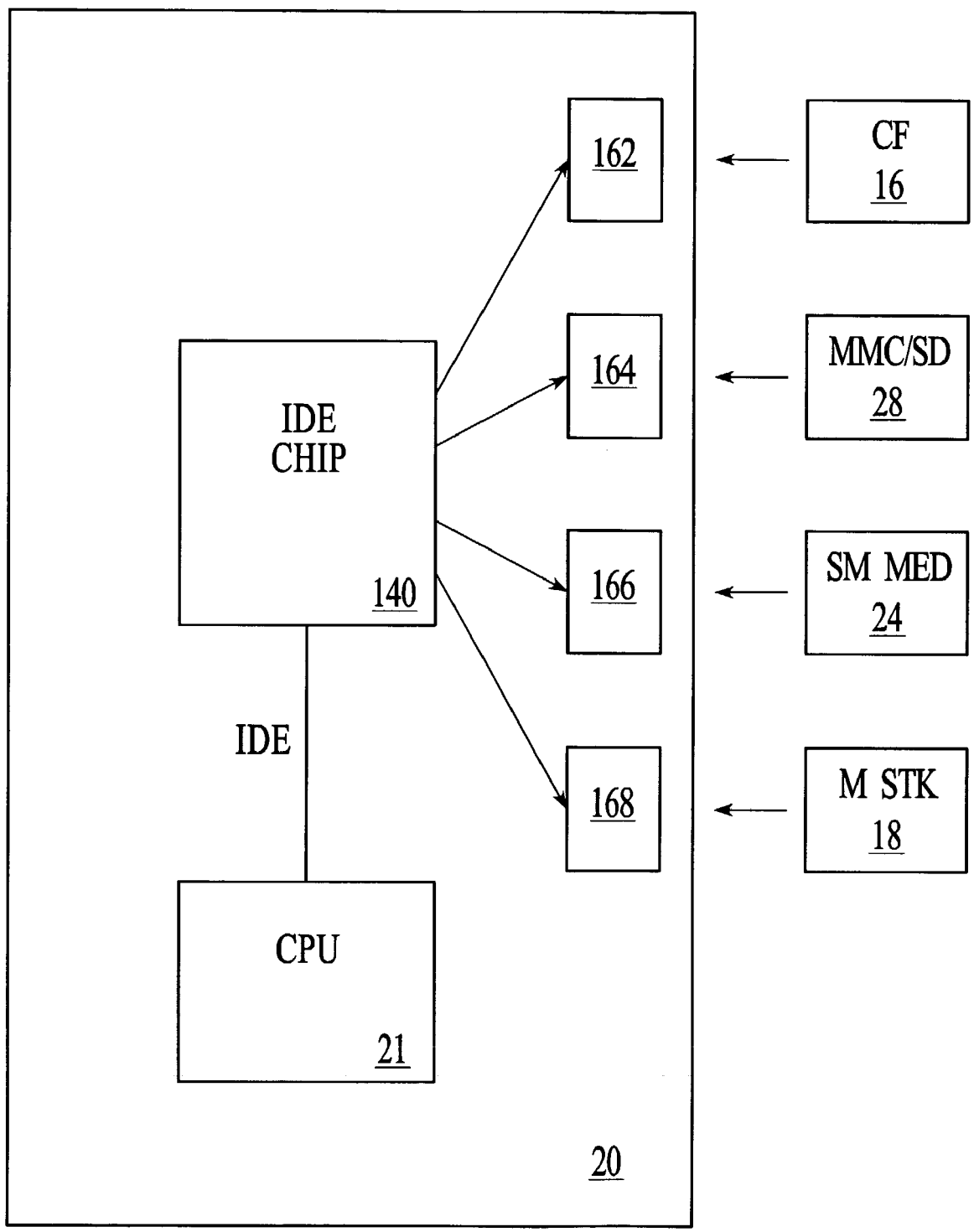
FIG. 14 shows a flash-memory reader within a PC, which utilizes the IDE converter chip.

FIG. 14 shows a flash-memory reader within a PC, which utilizes the IDE converter chip. Four slots and four connectors are provided in flash reader 42. A 50-pin CompactFlash connector 162 fits CompactFlash card 16, a 9-pin MMC/SD connector 164 fits MultiMediaCard 28 or a Secure Digital card, a 22-pin SmartMedia connector 166 fits SmartMedia card 24, and a 10-pin Memory Stick connector 168 fits Memory Stick card 18.

Each of the four connectors 162, 164, 166, 168 route their signals to the IDE converter chip 140. The IDE converter chip 140 detects when a flash-memory card has been inserted into one of the connectors 162, 164, 166, 168 and configures itself to read files from the inserted card using the pin interface of FIG. 5 corresponding to the card type. Each of the flash-memory cards in connectors12, 164, 166, 168 can be assigned a different drive letter by the operating system, such as E:, F:, G:, and H:.

The IDE converter chip 140 executes various routines to perform handshaking with the flash-memory cards and accept data, either serially or in parallel. The data is buffered and then sent to the CPU 21 in PC 20 through an internal IDE-interface bus. The IDE converter chip 140 generates the appropriate IDE-interface signals to transfer the data to CPU 21.

Flash Reader

Figure 15:
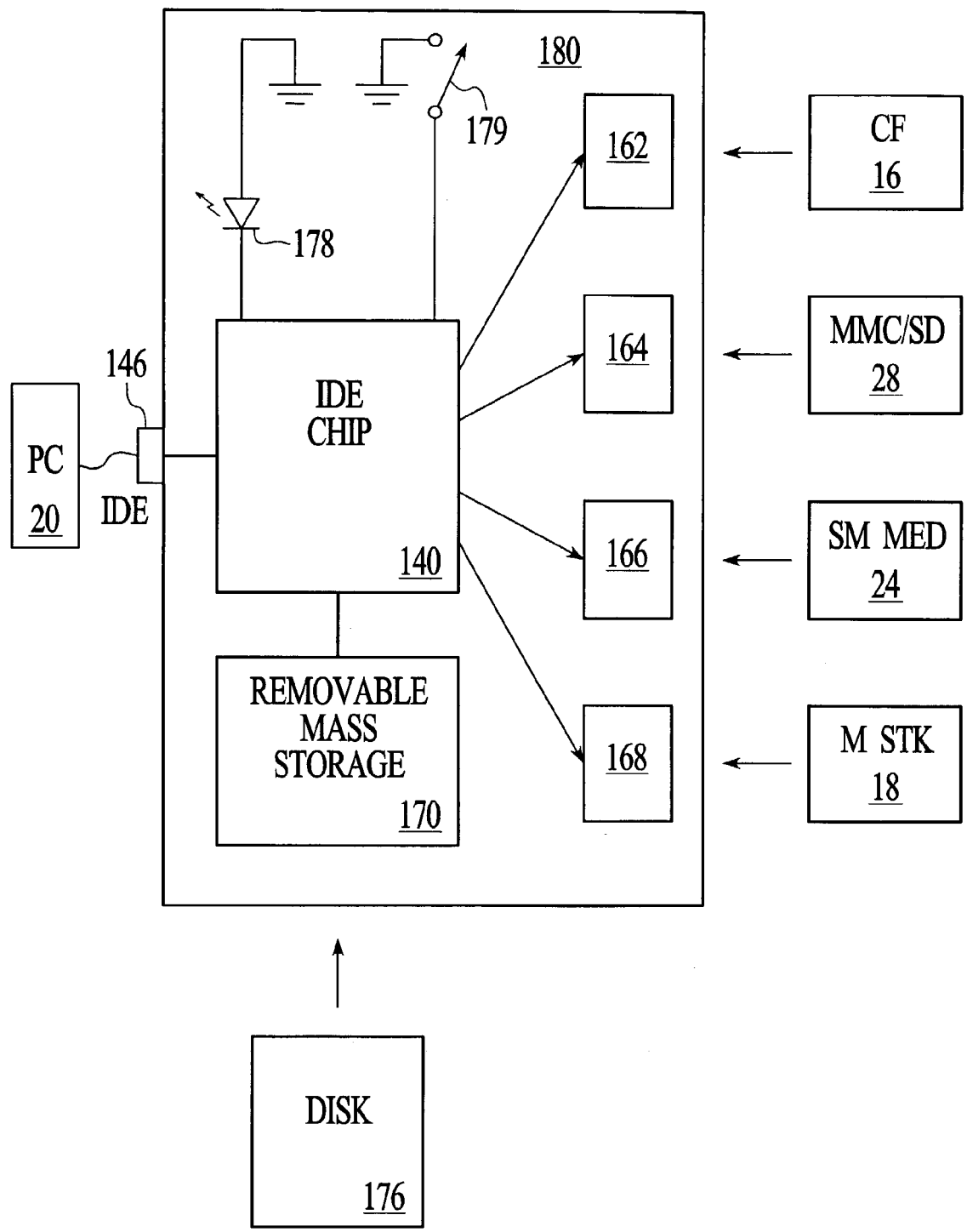
FIG. 15 is a diagram of a stand-alone Flash reader with an IDE converter chip that accepts several formats of flash-memory cards and can copy images to a removable disk without being connected to a host PC.

FIG. 15 is a diagram of a stand-alone Flash reader with an IDE converter chip that accepts several formats of flash-memory cards and can copy images to a removable disk without being connected to a host PC. Digital photographers may not always have their PCs nearby. While extra flash-memory cards can be purchased and swapped in the digital camera, these flash-memory cards are somewhat expensive, especially when many high-resolution images are captured. Especially during a long trip away from the PC, the user may be limited by the capacity of the flash-memory cards.

Flash reader 180 has four slots and four connectors are provided in Flash reader 180. A 50-pin CompactFlash connector 162 fits CompactFlash card 16, a 9-pin MMC/SD connector 164 fits MultiMediaCard 28 or a Secure Digital card, a 22-pin SmartMedia connector 166 fits SmartMedia card 24, and a 10-pin Memory Stick connector 168 fits Memory Stick card 18.

Each of the four connectors 162, 164, 166, 168 route their signals to the IDE converter chip 140. The IDE converter chip 140 detects when a flash-memory card has been inserted into one of the connectors 162, 164, 166, 168 by sensing card select lines CD0, CD1 and configures itself to read files from the inserted card using the pin interface of FIG. 5 corresponding to the card type.

The IDE converter chip 140 executes various routines to perform handshaking with the flash-memory cards and accept data, either serially or in parallel. The data is buffered and then sent either to host PC 20 through IDE connector 146 or to removable mass storage 170. The IDE converter chip 140 generates the appropriate signals to transfer the data to host PC 20. The IDE converter chip 140 also generates the control signals for removable mass storage 170, allowing the image data read from the flash-memory card to be written to removable disk 176. Removable disk 176 could be a standard or a high-density floppy diskette, a tape drive, a write-able CD-R/W disk, or other proprietary media such as LS120 by Imation of Oakdale, Minn., or ZIP drives by Iomega Corp. of Roy, Utah.

Each of the flash-memory cards in connectors 162, 164, 166, 168 can be assigned a different drive letter by the operating system, such as E:, F:, G:, and H:. Removable mass storage 170 can also be assigned a drive letter.

When Flash reader 180 is not attached to host PC 20, image files may still be copied to removable mass storage 170. Flash reader 180 may be carried along on a trip by the user, allowing the user to download image files to removable disk 176. Since removable disk 176 ordinarily has a much higher capacity than the flash-memory cards, many pictures may be captured when no access to host PC 20 is available.

Flash reader 180 can be provided with battery power or with its own AC converter. Optionally an LCD display can be used to preview file names and pictures.

Flash reader 180 is provided with a simple user interface, including light-emitting diode LED 178 and button 179. When the user inserts a flash-memory card into one of connectors 162, 164, 166, 168, and removable disk 176 is inserted into removable mass storage 170, the user presses button 179. This activates the IDE converter chip 140, which determines which of connectors 162, 164, 166, 168 has a memory card inserted, and copies the image files to removable mass storage 170. LED 178 can be programmed to blink during the copying process, and remain lit when the copying is complete, or vice-versa. This provides a simple visual indication to the user of the copying progress. Errors can be indicated with additional LED indicator lamps, or other blinking arrangements or colors.

Figure 16:
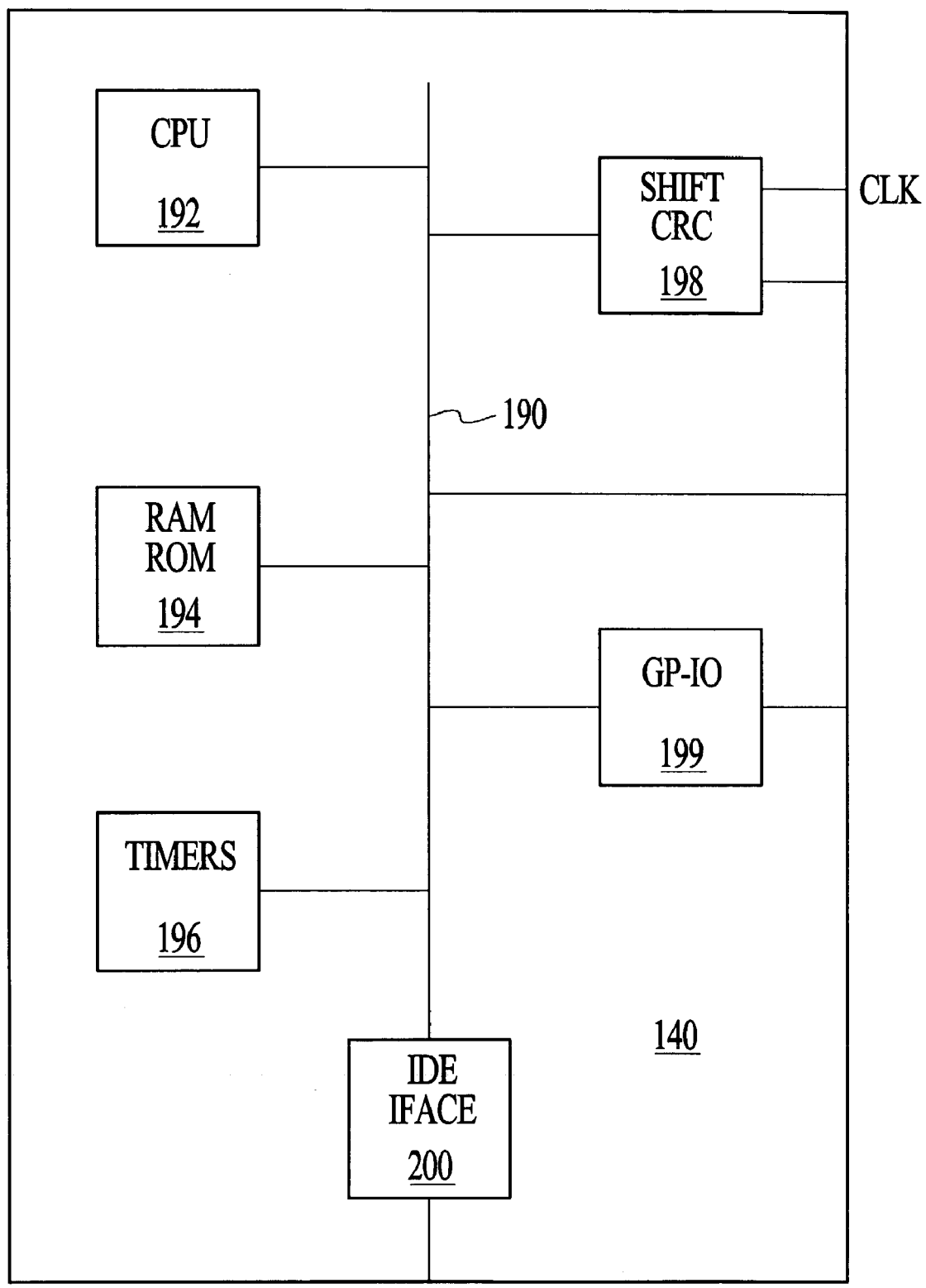
FIG. 16 is a diagram of the IDE converter chip for the flash-memory reader.

IDE Converter Chip 140 FIG. 16 is a diagram of the IDE converter chip 140 for the flash-memory reader. The IDE converter chip 140 can be implemented as a commercially available micro-controller chip that is programmed to read and write I/O pins that are connected to the flash-memory-card connectors and the IDE interface. Several different control and transfer routines are written and programmed into RAM/ROM 194. CPU 192 then executes these routines. A high-level scanning routine can sense when a flash-memory card is inserted. CPU 192 can then begin execution of another routine specific to that type of flash-memory card. Transfer and handshake sub-routines can then be called.

General-purpose input-output GPIO 199 provides registers or I/O ports that drive external I/O pins of the IDE converter chip 140, or read the logic-levels or voltages on input pins to the IDE converter chip 140. CPU 192 can read registers in GPIO 199 that are written by control signals that are coupled to I/O pins of the IDE converter chip 140 from connectors 162, 164, 166, 168. Control signals to the flash-memory cards can be switched high or low by writing a 1 or a 0 to a register for that control signal in GPIO 199.

Timers 196 are useful for asserting control signals for a required amount of time. For example, a control signal may need to be asserted for a specified number of microseconds. CPU 192 can write a 1 to a register in GPIO 199 and start a timer in timers 196. Timer 196 can sent an interrupt to CPU 192 when the specified time has elapsed, or CPU 192 can continuously or periodically poll timers 196 to determine when the specified time has elapsed. Then CPU 192 can write a 0 to the register in GPIO 199, causing the control signal to transition from 1 to 0.

Shifter 198 is connected to the data and clock signals from connectors 164 (not shown), 168. When data is read from the flash-memory card, a clock is pulsed to synchronize the data transfer. Shifter 198 clocks in one bit (serial) or word (parallel) of data for each clock pulse. A cyclical-redundancy-check (CRC) can be performed on the data to detect errors. CPU 192 can request re-transmission of data from the flash-memory card when an error is detected.

Data read by shifter 198 can be sent over internal bus 190 to be stored in a buffer in RAM/ROM 194. Later, CPU 192 can execute a routine to transfer this data from RAM/ROM 194 to IDE interface 200. IDE interface 200 then transmits the data over an external IDE link to a host PC. When a removable mass storage is present, some of the I/O pins from GPIO 199 can connect to the removable mass storage, or a separate disk controller can be included on IDE converter chip 140.

As is well known, IDE interface only supports one drive per connector. Accordingly, in a system and method in accordance with the present invention, special IDE commands must be provided to allow the interface to be expanded. Typically, there are two slots in a PC, a Master slot and a Slave slot. Accordingly, in a preferred embodiment, two new commands from the CPU 192 are needed, a first command to awaken the device by the converter chip and a second command to identify the device.

The first command which awakens a device such as a CompactFlash+SmartMedia+MemoryStick+MultiMediaCard+Secure Digital Card reader would be described as follows:

---

—0 nn 0 0 0 0 mm 0xFE where:
    —nn is set to 1 to awaken the device and 0 to make the device go to sleep (by default it would be asleep). This can be achieved by asserting a pin on the chip to be low at power up so it would stay inactive until it sees the "wake-up" command.
    —mm is 0xE0 if the device is connected as Master and 0xF0 it is a Slave.

The second command for reading/writing to the RAM/ROM 194 loads a plurality of registers as follows:
    —0 nn y 0 0 0 mm 0xFD where:
    —nn is the number of bytes to write/read
    —y is 1 for read and 0 for a write
    —mm is 0xE0 if the device is connected as Master slot and 0xF0 if the device is connected as a Slave slot.

---

Accordingly, through the present invention, the Master and Slave slots are expanded to handle multiple devices via the IDE converter.

Advantages of Improved Flash Reader for Reading Several Types of Flash-Memory Cards with or without a PC A universal adapter for flash-memory cards accepts cards of several different formats. The adapter accepts SmartMedia, MultiMediaCard, Secure Digital, and Memory Stick cards. The flash-card reader with a single slot accepts any format card using the adapter. Special detection logic on the flash reader distinguishes between the many flash-card formats. The low-cost passive adapter does not need an expensive converter chip. A multi-format reader is ideal for use with a PC. However, a stand-alone flash reader can copy image files from flash cards without a PC. Additionally, preparation of media for use in devices (format and erase operations) can be done using this reader.

A universal adapter is constructed using the CompactFlash card form factor. A reader that reads CompactFlash cards can then read any of the other flash-memory cards that plug into the CompactFlash adapter. The adapters are simple, inexpensive passive adapters without a conversion chip.

The disclosed pin mapping from the smaller flash-card formats to CompactFlash allows for easy detection of the type of flash-memory card inserted into the adapter. Detection of the type of flash-memory card is thus performed automatically by electronic detection by the CompactFlash reader. The CompactFlash reader is modified to perform this card-type detection. Signal conversion such as serial-to-parallel is performed by the CompactFlash reader rather than by the adapter. Adapter costs are reduced while CompactFlash reader cost is increased only slightly. The CompactFlash reader can use a single CompactFlash slot to read multiple flash-card types, including SmartMedia, MultiMediaCard, Secure Digital, Memory Stick, and CompactFlash.

Alternate Embodiments of Improved Flash Reader for Reading Several Types of Flash-Memory Cards with or without a PC Several other embodiments are contemplated by the inventors. Different flash-card formats can be supported such as Smart Cards, and more or less than the four slots shown in the multi-card flash reader can be included. Other adapters can be used for newer flash formats for the single-slot CompactFlash reader. Any device that needs Control Bus, Clock, Data Bus and Address Bus can be designed to fit into this slot. Examples of such devices include (but are not limited to) DSL Modems, Fingerprint security devices, Miniature Hard disks, Digital Cameras, Video Cameras etc.

While the invention has been described as connecting to a personal computer PC host, the host may also be an Apple computer such as the iMAC or G3. The host may also be a SUN computer or any host computer using IDE interfaces. The invention can also apply to Personal Digital Assistants (PDAs) such as by Palm Computer or other handheld appliances, such as a Cell phone with IDE capability.

The term "CompactFlash reader" has been used for simplicity, since digital images are often read from the flash-memory card and then written to the PC. However, the CompactFlash reader is capable of reading files from the PC or from another flash-memory card and writing the file to the flash-memory card. Thus the CompactFlash reader is really a reader/writer.

In a second embodiment, the CompactFlash reader is a stand-alone device that can operate without a PC. A removable disk media such as a R/W CD-ROM is included. Images from the flash-memory card are copied to the removable disk media by the CompactFlash reader. A simple interface is used; such as having the user press a button to initiate image transfer.

In other alternate embodiments, the CompactFlash reader/multi-flash reader can be designed into a self-hosted appliance such as an MP3 player or a keyboard or a monitor or a stereo appliance. Additionally, the CompactFlash/multi-flash reader can also be designed into handheld data collection scanner devices. The CompactFlash/multi-flash reader can also be designed into personal digital assistant devices, pocket personal computer devices that use, for example, Microsoft Palm operating systems. The compact Flash/multi-flash reader can also be designed into hand terminal devices, personal communicator devices, advanced two-way pager devices, audio recorder and player devices.

In addition, the compact Flash/multi-flash could be designed into monitoring devices for various purposes. The devices include, but are not limited to, any device which requires a PC or paper readout, projector devices, industrial computer devices, printer devices, human input devices, medical devices and digital picture frame devices. These monitoring devices, for example, could be pacemakers, fetal monitors, insulin monitors, chemical monitors, seismic monitors, or the like.

Description of Active Adapter Chip for use in a Flash Card Reader

Although the above-identified CompactFlash readers operate effectively for the stated purpose, they cannot be utilized effectively in certain circumstances. The flash readers only allow for interface to USB on the output side and therefore cannot act as a translator between other interfaces such as IDE, CompactFlash or PCMCIA interfaces. In addition, the conventional method for storing the memory necessarily means that the some of the slots are inverted. A system and method in accordance with the present invention provides an active adapter that overcomes the above-identified problems.

Universal Active Adapter

Figure 17:
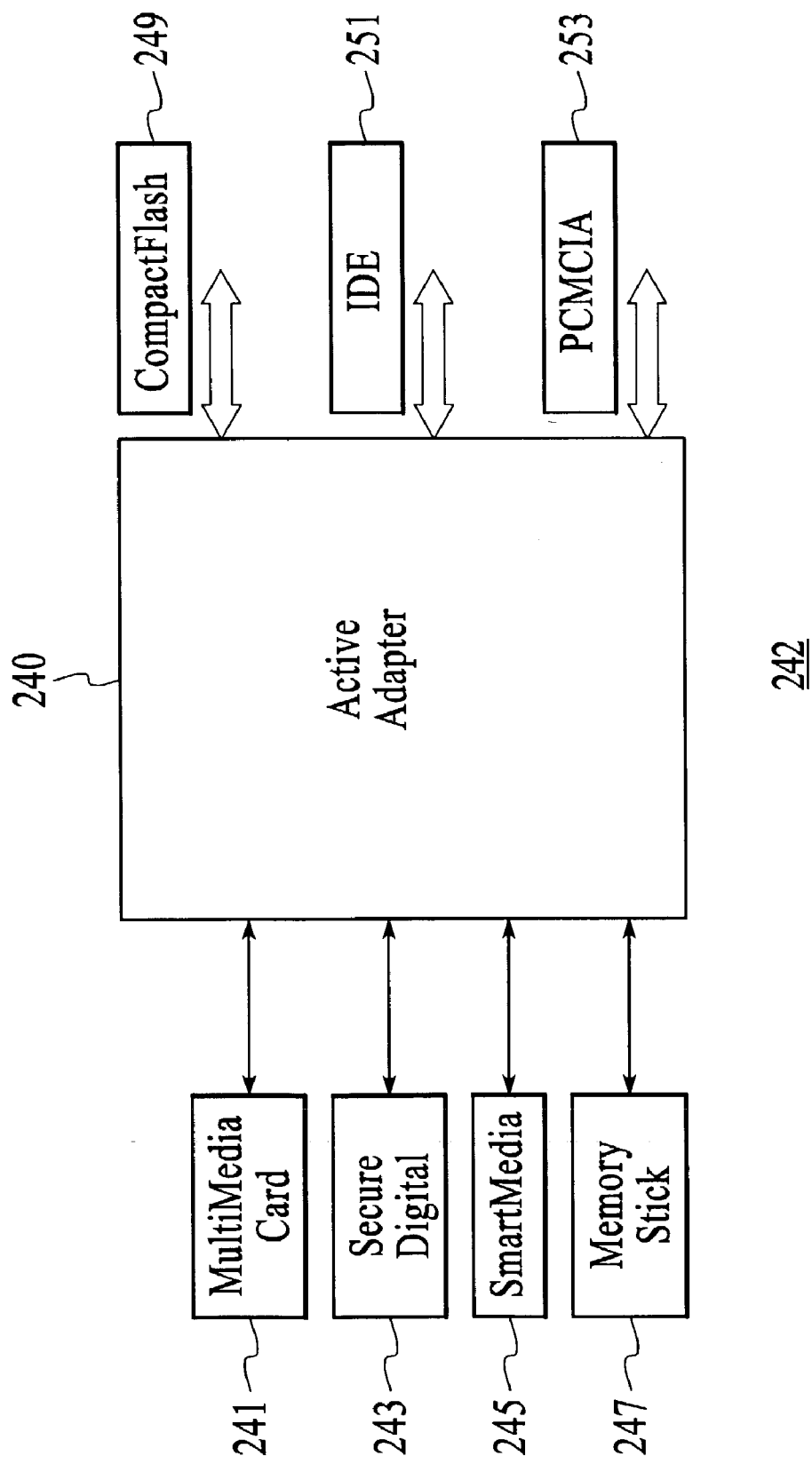
FIG. 17 shows a CompactFlash reader system that reads SmartMedia, MultiMediaCard, Secure Digital, and Memory Stick flash-memory cards on the input side and interfaces to CompactFlash, IDE and PCMCIA on an output side.

FIG. 17 shows a CompactFlash reader system 242 that reads SmartMedia 245, MultiMediaCard 241, Secure Digital 243, and Memory Stick flash-memory cards 247 on the input side and interfaces to CompactFlash 249, IDE 251 and PCMCIA 253 on an output side. In a preferred embodiment, the CompactFlash reader 242 has an opening or slot with a 50-pin connector that accepts a CompactFlash card 24a. An active adapter 240 performs handshaking with a CompactFlash card 24a and performs data transfer. The active adapter 240 also controls the interface to the host PC, allowing image files to be transferred to the PC from any of the CompactFlash, IDE interface. Accordingly, the active adapter 240 in accordance with the present invention can read a variety of flash memory cards.

CompactFlash reader 242 can also read other kinds of flash-memory cards. For example, active adapter 240 allows Memory Stick card 247 to be read. Active adapter 240 has an opening that Memory Stick card 247 fits into, while active adapter 240 itself fits into 50-pin connector, since active adapter 240 has the same form factor as a CompactFlash card.

The SmartMedia card can also be read by CompactFlash reader 242, using active adapter 240. Likewise, MultiMediaCard or Secure Digital card can be read using active adapter 240. The active adapter 240 acts as translation between flash media and the plurality of interfaces. FIG. 18 is a table showing the translator in between the flash media and the plurality of interfaces. To describe the features of the active adapter chip 240A, refer now to the following.

Active Adapter Chip 240A

Figure 19:
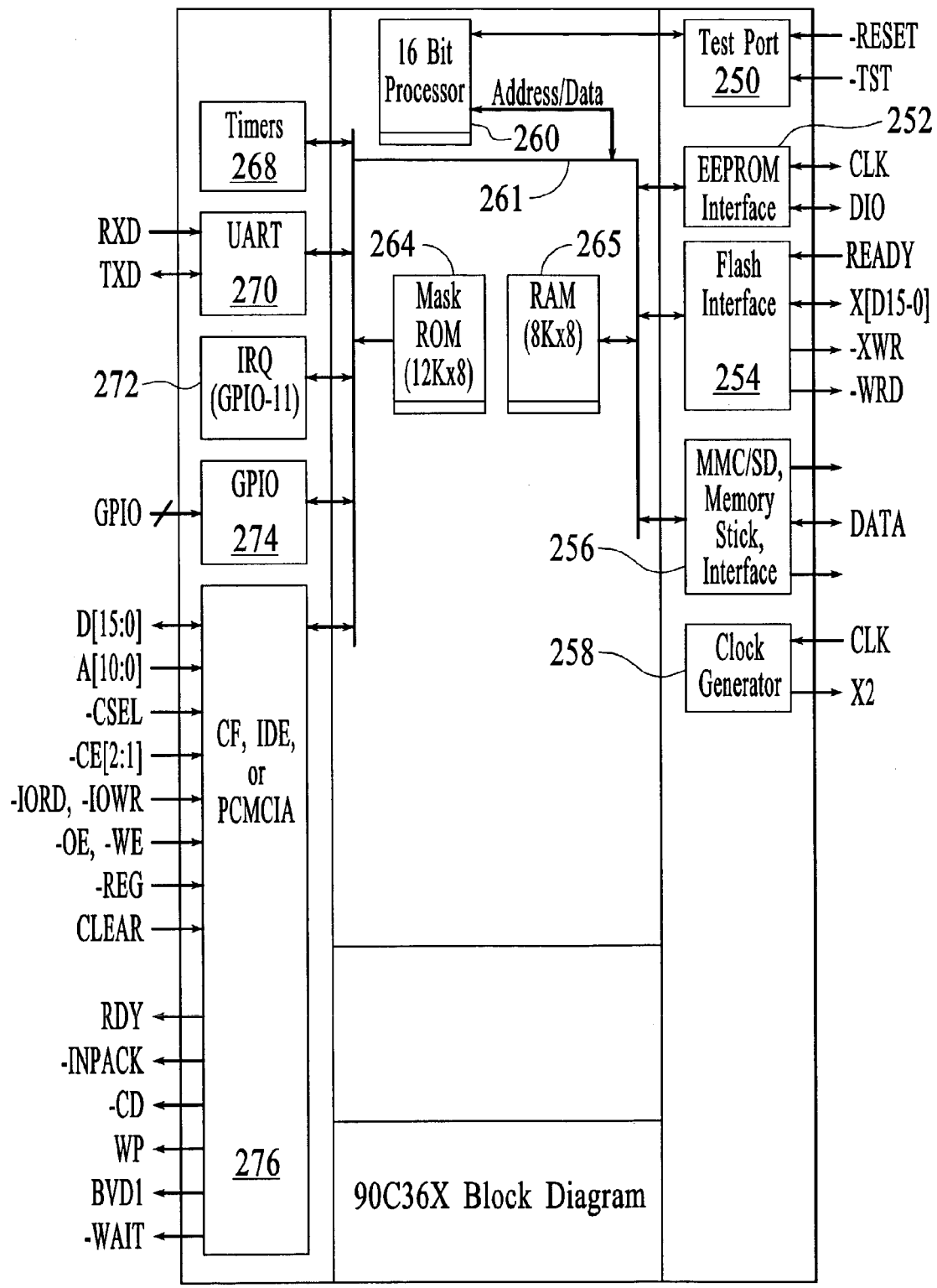
FIG. 19 is a block diagram of an active adapter chip in accordance with the present invention.

FIG. 19 is a block diagram of active adapter chip 240A in accordance with the present invention. As before mentioned, the active adapter 240 is designed to connect a Memory Stick, SmartMedia, MMC or SD card to a CF slot. On an input side, the active adapter chip 240A includes a test port 250, an EEPROM interface 252, a flash interface 254, a Memory Stick interface 256 and a clock generator 258. A processor 260 is coupled to all interfaces 252, 254 and 256 via a bus 261. A mask ROM 264 and RAM 266 are also coupled to the bus 261. On an output side, timers 268, UART 270, IRQ 272, GPIO 274 and a CF, IDE, PCMCIA interface 276 are coupled to the bus 261. The features of the active adapter chip 240A will be described herein below.

Input Side

MMC/SD Memory Stick Interface 256

This interface provides support for MMC/SD and Memory Stick cards. The MultiMediaCard (MMC), Secure Digital Card (SD Card) and MemoryStick are serial access devices. These devices typically require in-bound/out-bound data to be appended with CRC information. The processor provides support in hardware to generate the CRC and to convert serial to parallel and parallel to serial bit streams. A programmable clock speed is provided to set the clock speed based on the media's capabilities.

EEPROM Interface 252

This port is used to read a serial EEPROM that contains programs for the internal processor.

CompactFlash/Smart Media Interface 254

This is the port for connecting a parallel device such as CompactFlash or SmartMedia cards. ECC generation and checking is provided for SmartMedia.

Clock Generator 258

This is the oscillator for the chip's internal clock.

UART Port 270

The UART port supports 7200 to 115.2K baud. Is useful as a debug port and can also be used to access the EEPROM for reads/writes from the serial port.

Output Side

Timers 268

The timers are used for time-dependent functions. For example, when power is turned on to a flash card there must be a delay before the card is accessed.

GPIO 274 and IRQ 272

The GPIOs 274 and IRQ 172 are general-purpose input/output pins. They are used to control various Flash Card functions such as turning power on and off, detecting when a card is plugged in, detecting if a card is write protected, etc. For example, GPIO {11:10} can be used to generate an interrupt to the internal processor when there is change of state on one of these pins. This is used to detect the removal of a flash card.

CF/PCMCIA/IDE Interface 276

This interface is used to connect to a CompactFlash, PCMCIA, or IDE port. Compact Flash is a subset of PCMCIA, the only real difference being the CompactFlash uses a smaller connector than PCMCIA. IDE is the standard disk connection inside a PC. CompactFlash/PCMCIA or IDE mode is selected when the chip is reset. If—OE is low during reset then IDE mode is selected.

Processing System (Processor 260, and ROM 264 and RAM 264)

Processor 260

The processor (preferably a 16-bit processor) along with the RAM and ROM controls the interface 276. The processor 260 detects the type of flash card plugged into the CF/Smart Media or MMC/SD/Memory Stick ports, configures itself accordingly and then translates commands received on the CF/PCMCIA/IDE interface 260 and passes them to the attached flash card.

Pin Mapping

FIG. 20 is a table of pin mappings for the SmartMedia, MMC/SD, and Memory Stick to CompactFlash adapters. The pin numbers for the smaller interfaces for SmartMedia, MMC/SD, and Memory Stick are not shown but can be in any order or designation. The adapter connects the proper pin on the smaller interface to the CompactFlash pin number shown in FIG. 20. Simple wiring such as individual wires, flat cables, printed-circuit board (PCB), or wiring traces can be used.

The ground pins on the smaller interfaces are connected to CompactFlash pins 1 and 50. Power pins are connected to CompactFlash pins 13, 38. Pins 25, 26 are the card detect signals for CompactFlash, which the adapters connect to the card-detect signals on all smaller interfaces.

The CompactFlash connectors use pins 2–6, 21–23, 27–31, and 47–49 for the 16-bit parallel data bus to the CompactFlash card. Pins 8, 10–12, and 10–20 form a separate 11-bit address bus. The separate data and address buses provide for rapid random addressing of CompactFlash cards. Other control signals include pins 7, 32 byte enables, pin 9 output enable, pin 36 write enable, interrupt pin 37, reset pin 41. Several pins in the 50-pin interface are not connected.

The smaller SmartMedia interface also has a parallel data bus of 8 bits. These are mapped to pins 2–6, and 21–23 of the CompactFlash interface to match the CompactFlash D0:7 signals. While no separate address bus is provided, address and data are multiplexed. Control signals for latch enables, write enable and protect, output enable, and ready handshake are among the control signals. Output Enable (OE) and Write Enable (WE) are mapped to the same function pins 9, 36 of the CompactFlash interface. The total number of pins in the SmartMedia interface is 22.

The Memory Stick and MMC/SD flash-memory-card interfaces are smaller still, since parallel data or address busses are not present. Instead, serial data transfers occur through serial data pin DATAIO, which is mapped to pin 17 (A3). Data is clocked in synchronization to clock SERCLK on pin 18. A command signal CMD or BITSET occupies pin 20 (A0). The MMC/SD and Memory Stick interfaces require only 6 pins plus power and ground.

Detection logic in the active adapter chip 240A reads card-select pins CD0, CD1 to detect the presence of a flash-memory card. When a new card is present, detection logic then reads pins CE1, CE2 as inputs to determine the card type. The wiring inside the adapter and the card's behavior determines whether CE1, CE2 are pulled low or pulled high by the active adapter chip 240A.

Advantages of the Active Adapter Chip for use in a Flash Card Reader

An active adapter chip for flash-memory cards in accordance with the present invention accepts cards of several different formats. The active adapter chip accepts SmartMedia, MultiMediaCard, Secure Digital, and Memory Stick cards.

The active adapter is constructed using the CompactFlash card form factor. A reader that reads CompactFlash cards can then read any of the other flash-memory cards that plug into the CompactFlash adapter.

The disclosed pin mapping from the smaller flash-card formats to CompactFlash allows for easy detection of the type of flash-memory card inserted into the adapter. Detection of the type of flash-memory card is thus performed automatically by electronic detection by the CompactFlash reader. Signal conversion such as serial-to-parallel is performed by the CompactFlash reader rather than by the adapter. Adapter costs are reduced while CompactFlash reader cost is increased only slightly. The CompactFlash reader can use a single CompactFlash slot to read multiple flash-card types, including SmartMedia, MultiMediaCard, Secure Digital, Memory Stick, and CompactFlash and can also interface on the output side to a plurality of standards, including but not limited to CF, MMD/SC, IDE and PCMCIA standards.

Alternate Embodiments for Active Adapter Chip for use in a Flash Card Reader

The inventors contemplate several other embodiments. Different flash-card formats can be supported such as Smart Cards, and more or less than the four slots shown in the multi-card flash reader can be included. Any device that needs Control Bus, Clock, Data Bus and Address Bus can be designed to fit into these slots. Examples of such devices include (but are not limited to) DSL Modems, Fingerprint security devices, Miniature Hard disks, Digital Cameras, Video Cameras, printers and the like.

While the invention has been described as connecting to a personal computer PC host, the host may also be an Apple computer such as the iMAC or G3. The host may also be a SUN computer, or any host computer using a variety of interfaces. The invention can also apply to personal digital assistants (PDAs) such as by Palm Computer, printers or other handheld appliances, such as a cell phone with a variety of interface capabilities.

The term "CompactFlash reader" has been used for simplicity, since digital images are often read from the flash-memory card and then written to the PC. However, the CompactFlash reader is capable of reading files from the PC or from another flash-memory card and writing the file to the flash-memory card. Thus the CompactFlash reader is really a reader/writer.

In other alternate embodiments, the CompactFlash reader/multi-flash reader can be designed into a self-hosted appliance such as an MP3 player, printer, or a keyboard or a monitor or a stereo appliance. Additionally, the CompactFlash/multi-flash reader can also be designed into handheld data collection scanner devices. The CompactFlash/multi-flash reader can also be designed into personal digital assistant devices, pocket personal computer devices that use, for example, Microsoft Palm operating systems. The compact Flash/multi-flash reader can also be designed into hand terminal devices, personal communicator devices, advanced two-way pager devices, audio recorder and player devices.

Description of Memory Module which Includes a Form Factor Connector

A plurality of flash media are coupled to a single form factor connector to provide a module, i.e., referred to as a SmartStack module that can be coupled directly to the device. The SmartStack module does not include a controller and is controlled from the host side. The form factor connector would typically be a CompactFlash (CF) form factor or some other form factor that are used in a variety of devices. The SmartStack memory module in a preferred embodiment includes a write protect switch that will allow for certain portions of the memory within the SmartStack module not to be written to. In addition, a portion of the flash memory will be allocated to the secure area for storing information to implement various forms of security. Another portion of the flash memory is allocated to store optional biometric information such as a user's fingerprint or retinal scan information, etc.

Figure 21:
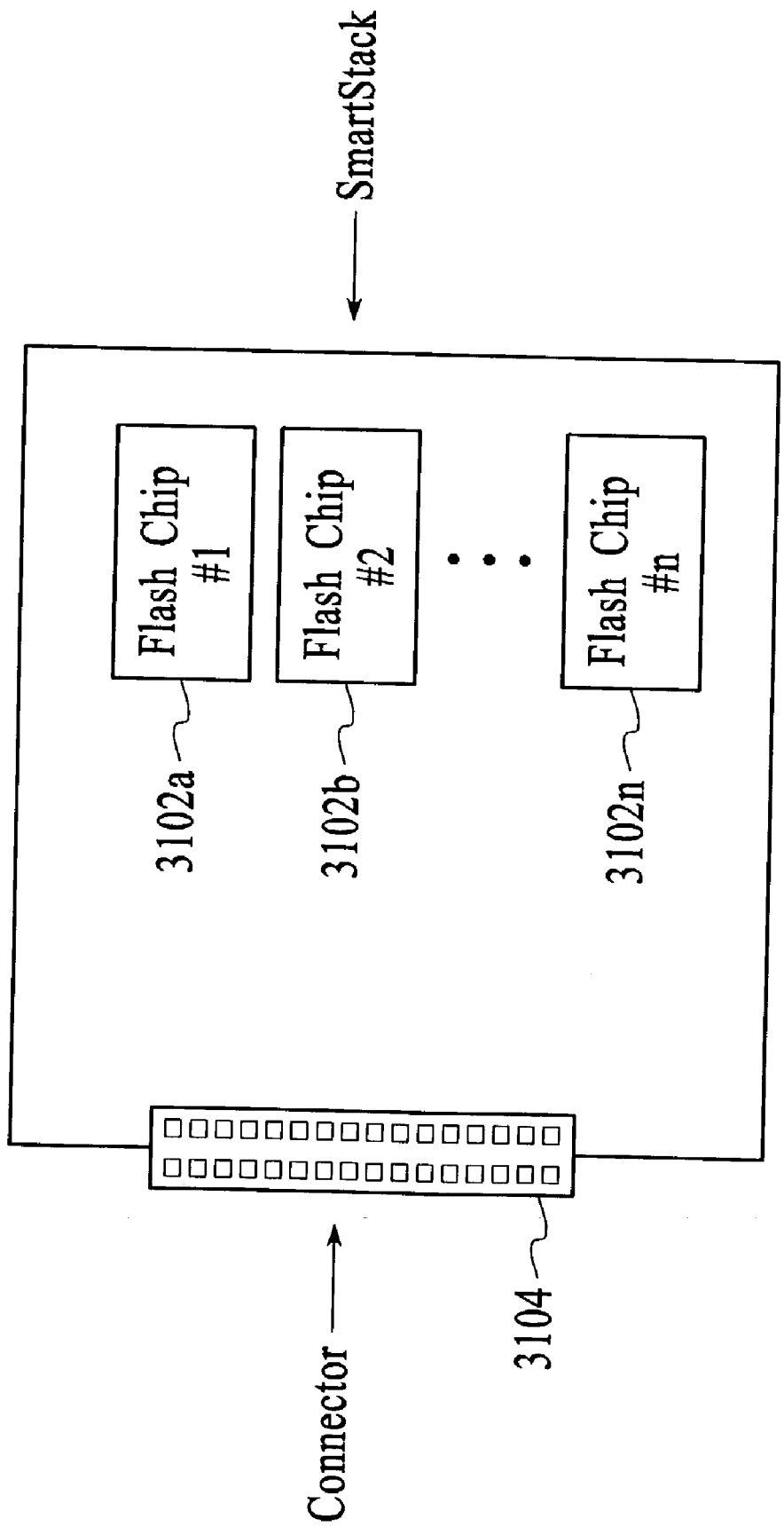
FIG. 21 illustrates a SmartStack module.

To more fully describe the present invention, refer now to the following description in conjunction with accompanying figures. FIG. 21 illustrates a SmartStack module 3100. The SmartStack module 3100 comprises a plurality of memory devices (i.e., flash chips 3102*a*, 3102*b* through 3102*n*) coupled to a connector 3104. In a preferred embodiment, the flash chips are coupled together such that there is redundancy for each section.

Figure 22:
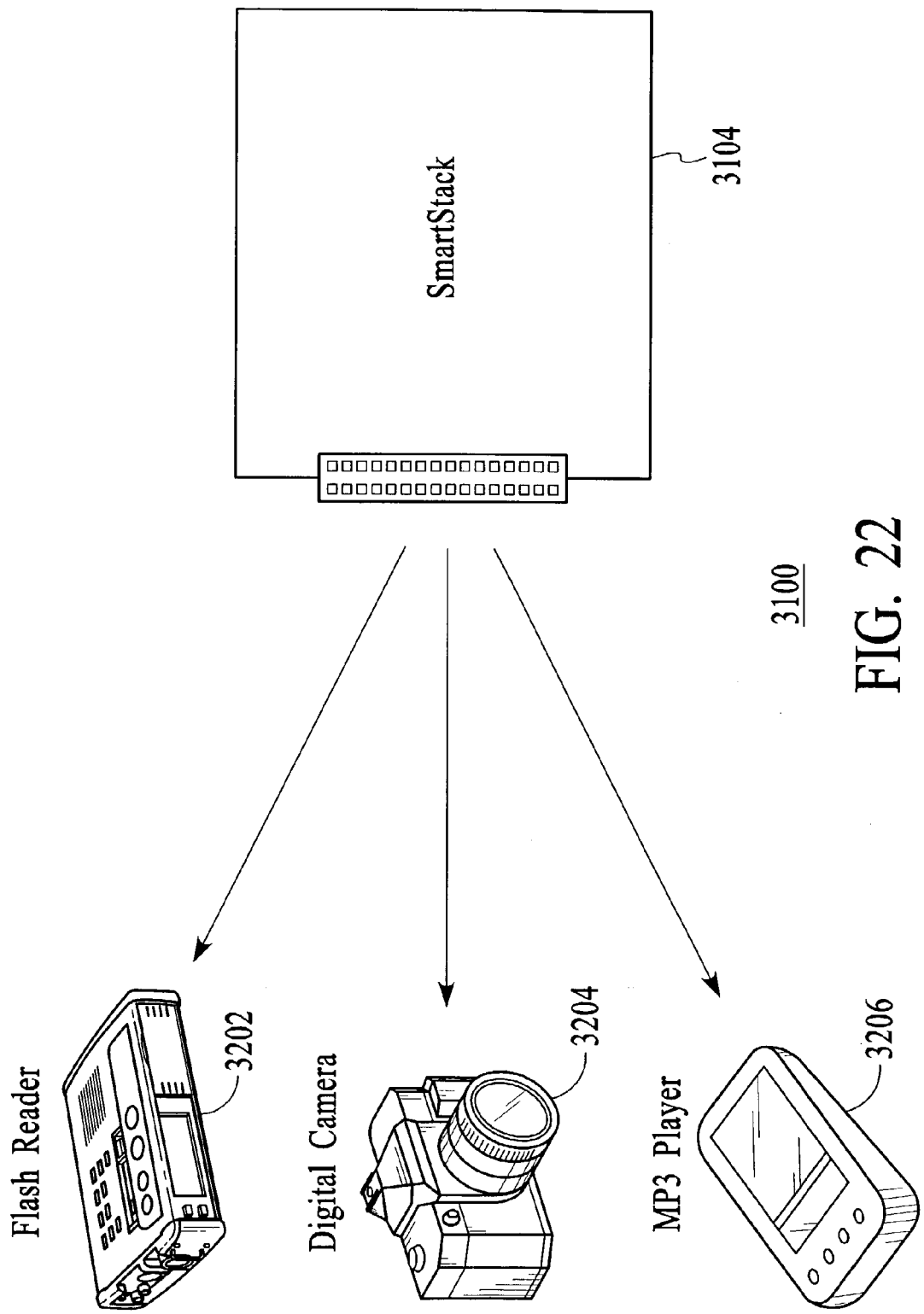
FIG. 22 illustrates examples of the kinds of applications that can utilize the SmartStack module, such as a flash reader, digital camera or MP3 player.

In a preferred embodiment the SmartStack module would have the same form factor as a CompactFlash (CF) card. The module could then be plugged into any CF slot. FIG. 22 illustrates examples of the kinds of applications that can utilize the SmartStack module 3100, such as a flash reader 3202, digital camera 3204 or MP3 player 3206. In a preferred embodiment, only SmartStack module 3202 based CF readers can read/write to SmartStack media, and inserting a SmartStack module into standard CF readers will not damage the SmartStack. As is seen, the SmartStack module does not include a controller and is controlled from the host side. Since the module itself is devoid of any controller it can be expanded easily to add additional memory.

Card Detection

FIG. 23 is a table which illustrates how a particular card will be detected by a device. In this embodiment, when the SmartStack module (i.e., SmartStack NAND or SmartStack NOR) is plugged into the slot, the card detect pins (CD1 and CD2) will be low. For compatibility with a device that can read a SmartStack module card, the card enable pins (CE1 and CE2) will also be low. As is also seen, the other memory modules will have a different pin configuration for detection.

Addressing

FIG. 24 is a table that illustrates addressing of the SmartStack module. In a preferred embodiment, the SmartStack module will be programmed in a manner that is similar to a conventional memory module. The only difference will be the chip selects.

FIG. 24A illustrates the relationship between the SmartStack module address lines (S0 . . . S3) and their equivalent pins in a CompactFlash card.

Security and Biometric Information

Figure 25:
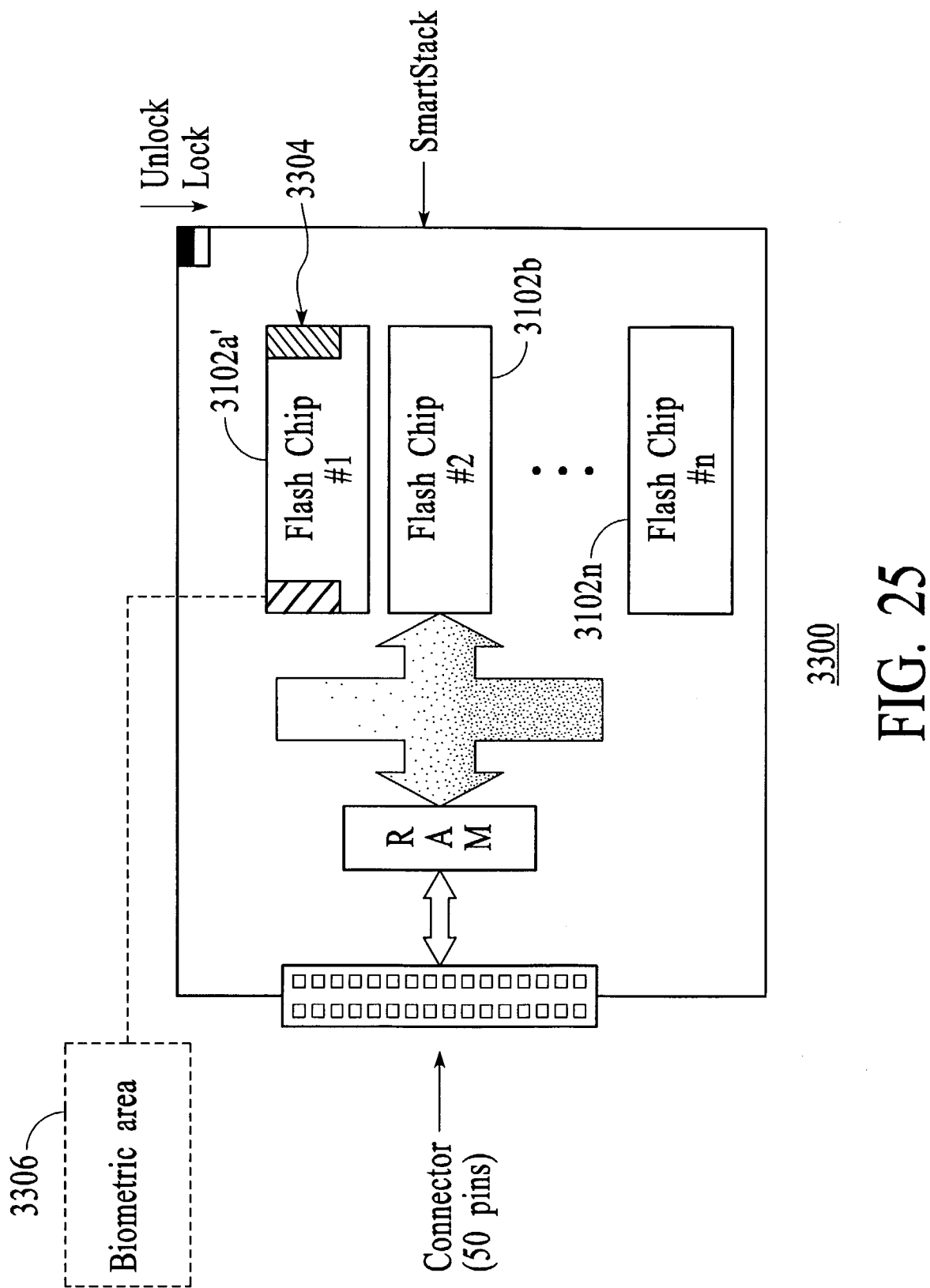
FIG. 25 illustrates a SmartStack module which includes the write protect mechanism, security area and biometric area.

FIG. 25 illustrates a SmartStack module 3300 which includes the write protect mechanism 3302, security area 3304 and biometric area 3306. The write protect mechanism can be locked or unlocked to allow for writing to the module. The write protect mechanism in a preferred embodiment may be read by software to prevent writing in the user area. It may be necessary to allocate space for security and biometric on each of the individual flash media, in which case the same table will be used to create this information. As is seen in this embodiment, the secure area 3304 and biometric area 3306 are allocated on 3102a'. One of ordinary skill in the art recognizes that the areas 3302 and 3304 could be located in any or all of the flash chips 3102a'–3102n' and that would be within the spirit and scope of the present invention that which illustrates the setting of a secure area of data for the SmartStack module. For providing a secure area in the SmartStack module, in a preferred embodiment the following method will be followed: the first two bytes, byte 0 and byte 1, will be set to C3 B6. The next byte, byte 2, defines the function. In addition, byte 5 (block status flag) will always be set to 0xF0 (or 0x0F) to indicate a failed block so that an operating system or firmware will not write over it accidentally.

Figure 27:
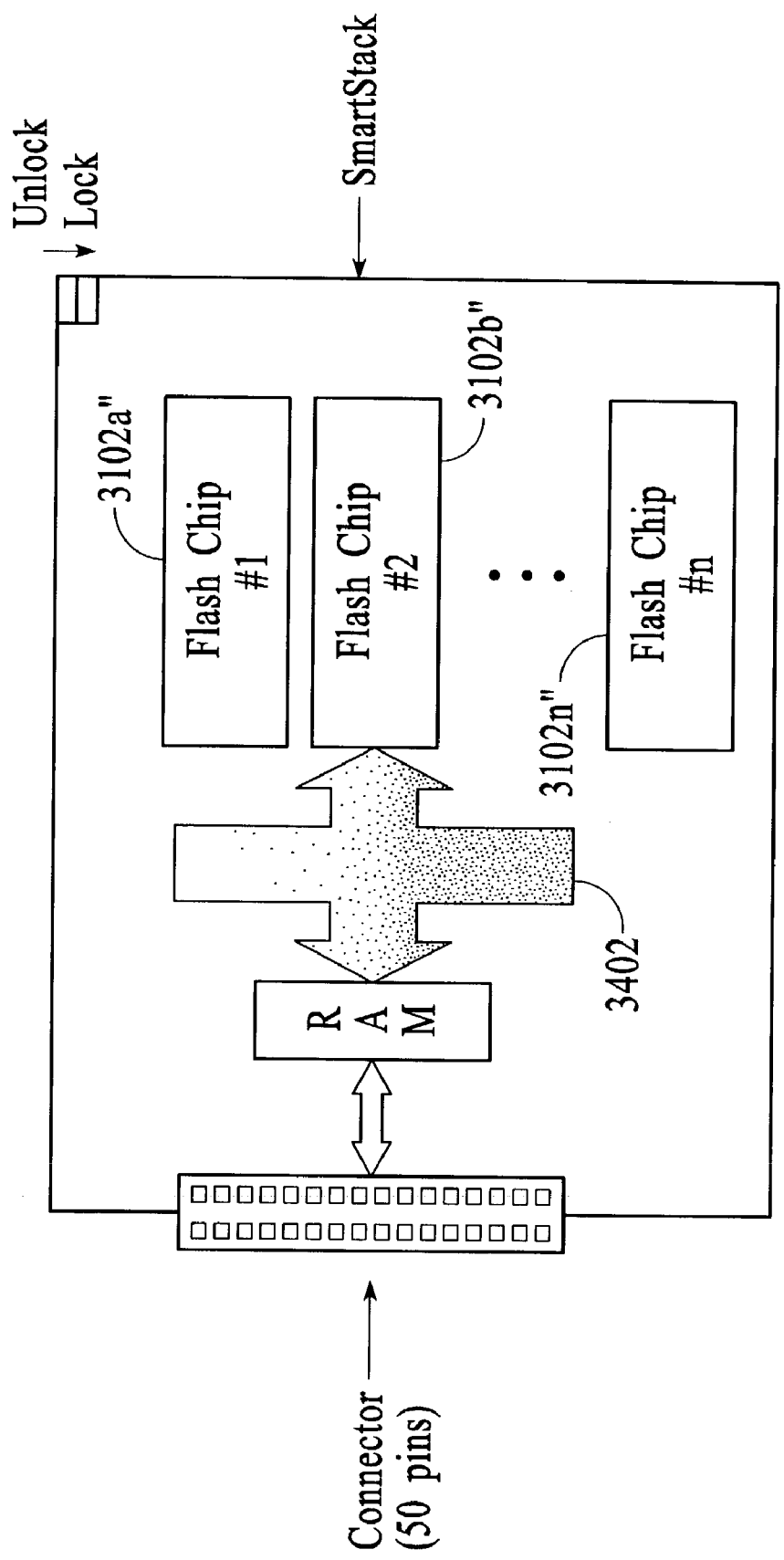
FIG. 27 illustrates adding a RAM to SmartStack module to improve performance.

An additional improvement for performance would be to add random access memory (RAM) to the stack. FIG. 27 illustrates adding a RAM 3402 to SmartStack module 3400 to improve performance. By adding the RAM 3402 to the module 3400, data can be cached thereto thereby allowing for faster access to data in the module.

Additionally the SmartStack module can be designed to function like daughter boards on a base board so the capacity can be modularly increased. The SmartStack module can also be designed such that you can plug one card at the end of the previous one to form a chain (or daisy chain).

Figure 28:
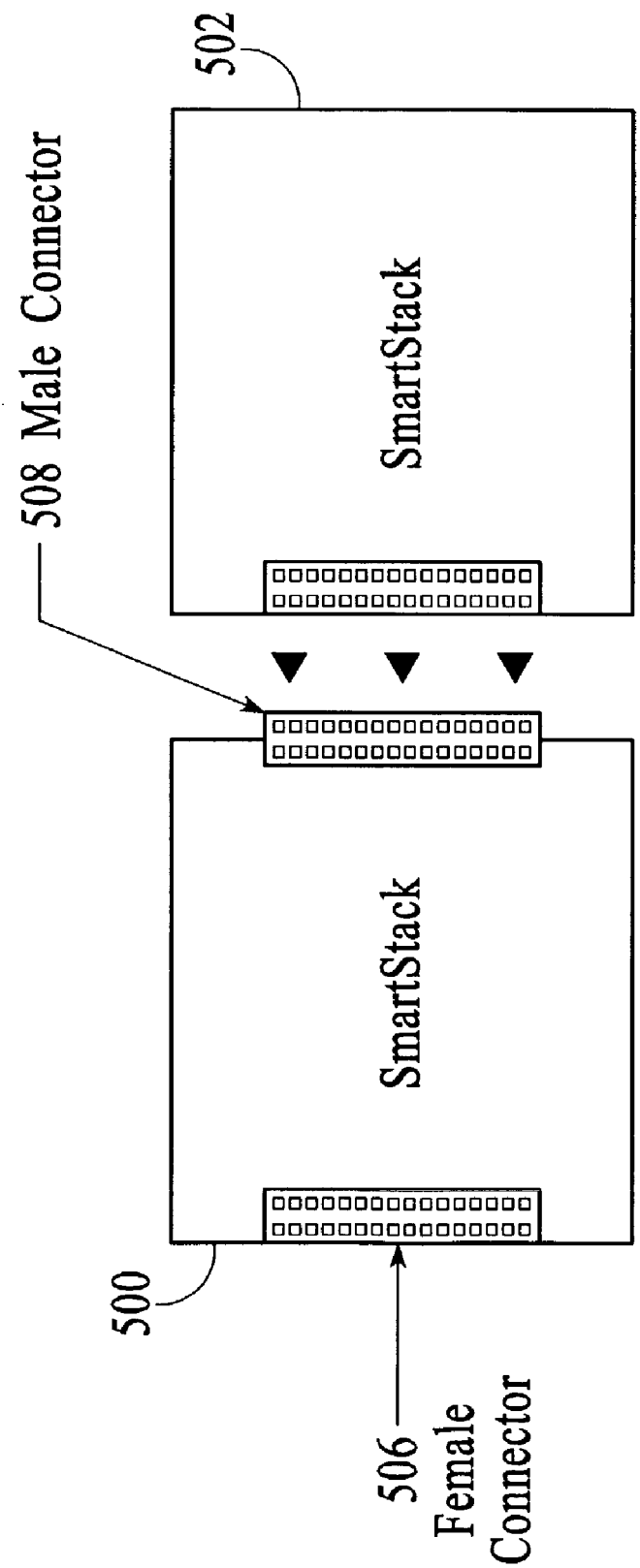
FIG. 28 illustrates daisy-chaining a plurality of SmartStack modules in accordance with the present invention.

FIG. 28 illustrates daisy-chaining a plurality of SmartStack modules 500 and 502 in accordance with the present invention. Accordingly, in this embodiment, one SmartStack module 500 would include a female connector 506 on one end and a male (expansion port) connector 508 on the other to allow more cards to be plugged in. In an alternate embodiment, the expansion card can be itself devised to have several expansion ports (female connectors) into which users can plug in SmartStack modules. The SmartStack module can optionally enable the user to have the capability of being able to review the pictures before committing it (saving it) to the flash media itself.

Figure 29:
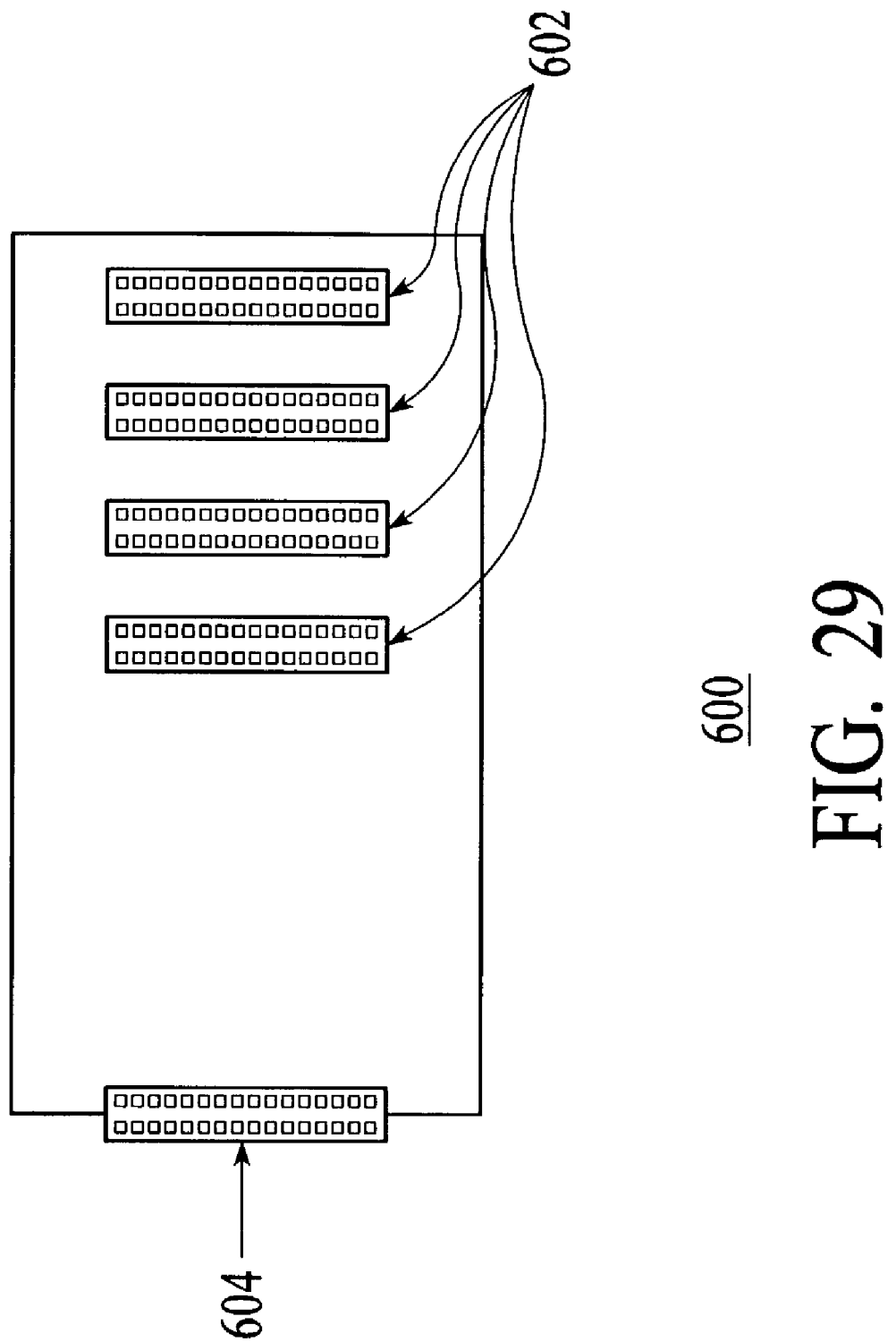
FIG. 29 illustrates a SmartStack module, which is an expansion bay.

FIG. 29 illustrates a SmartStack module 600, which is an expansion bay. In this embodiment, additional SmartStack modules can be plugged into male connection slots 602 and the female connector 604 would connect to a SmartStack enabled CompactFlash Host.

Multimode Controller for Intelligent and "Dumb" Flash Cards

Figure 30:
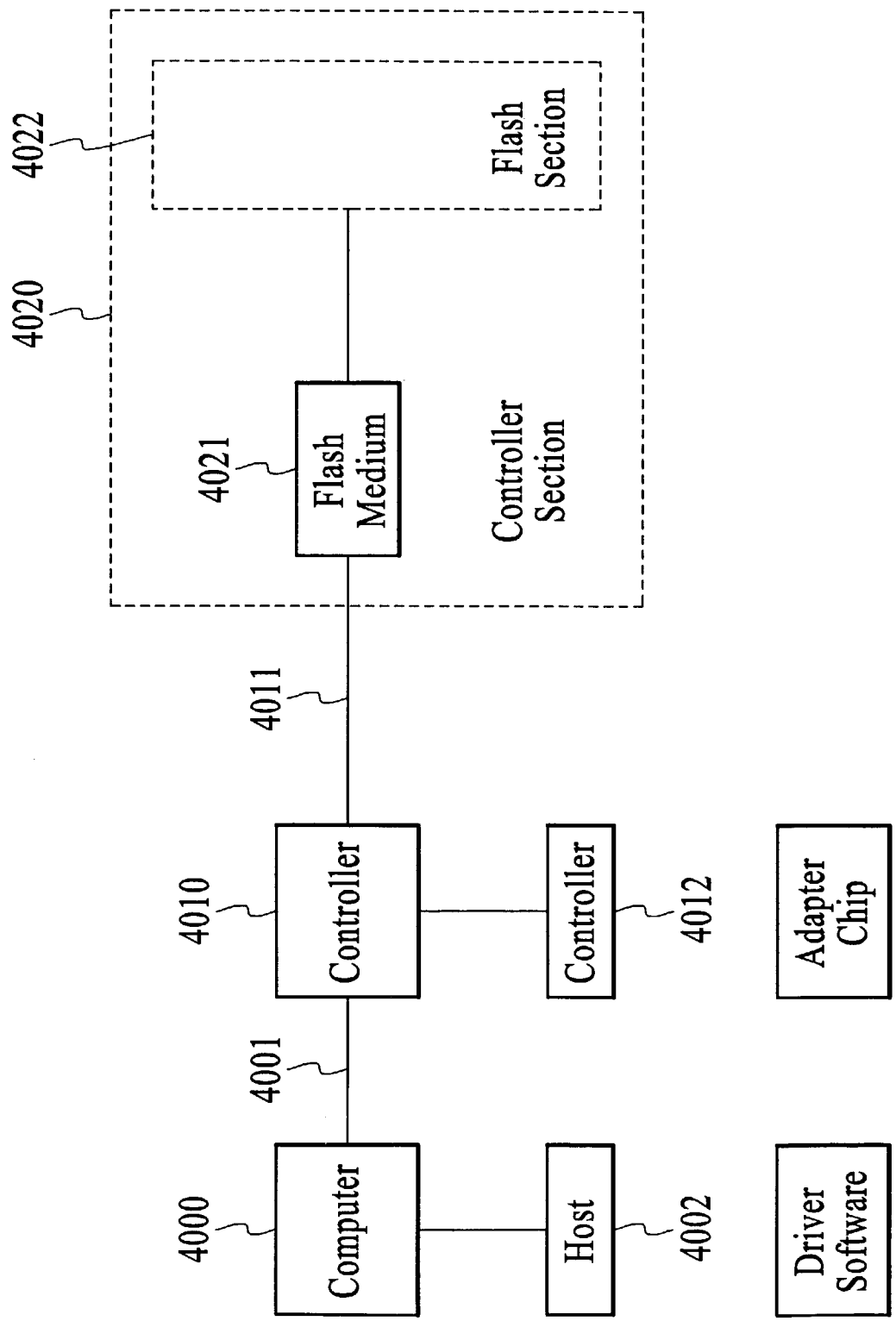
FIG. 30 illustrates a system that is adaptable to a single media type.

Most flash card system controllers can only work together with one type of flash medium. FIG. 30 illustrates a system that is adaptable to a single media type. However, as is known to the inventor and described above, in some cases some controllers may work with multiple media types at the same time.

Host computer 4000 may be any of a variety of computers, such as a PC, notebook, PDA, etc., having an interface connection 4001 that connects to controller IC 4010. For purposes of simplicity and clarity, the connection details are not shown. As described earlier, the interface connection may be any of a wide variety of types, such as IDE, USB, or (not shown above) Ethernet. Or it may be a system bus (PCI, etc.), or any other kind of suitable network interface or connectivity offered by computer 4000. Said interface is converted by controller IC 4010 into an interface 4011 to the flash medium 4020. Many aspects of that interface 4011 (and possible adapters, not shown here for clarity) have been described in great detail in previous sections, above.

Host computer 4000 also typically has driver software 4002, and adapter chip 4010 contains firmware 4012. Flash medium 4020 typically may consist of a controller section 4021 and a flash section 4022. In most cases, these sections are at least two separate ICs, although in some cases they may be integrated into one IC. However, in all cases, there is a significant added cost for the controller section, whether it comprises a separate chip or is integrated into a single IC with the flash.

Typically, the purpose of controller 4021 is to present a flawless medium to the system, in a specific format, so the computer 4000 sees an error-free storage medium 4020, rather than a flash 4022 that may have certain defects that must be mapped away.

Figure 31:
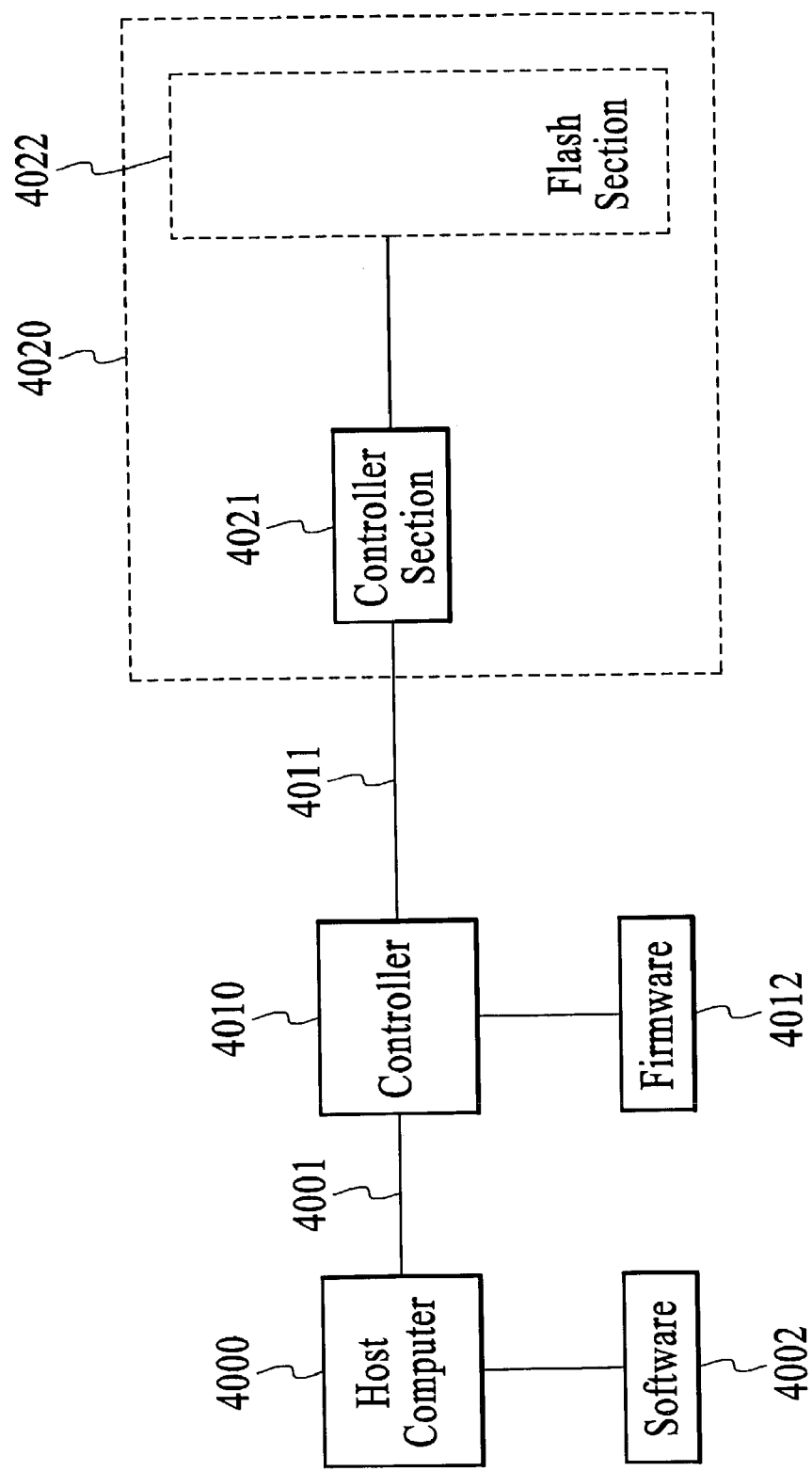
FIG. 31 shows a cost-improved flash medium.

FIG. 31 shows an improved flash medium 4020b. Flash medium 4020b still has a flash section or IC 4022, but the controller section 4021 has been removed. Shown now in detail is a medium ID 4030, some aspects of which have been discussed in earlier sections above, and which in some cases may be split between the flash medium and the media adapter cards, as also described earlier. That medium ID 4030 includes in some cases certain basic specifications of the medium, such as the memory type, the total capacity, etc. Originally, the controller 4021 (FIG. 30) was used to provide that kind of information; however, as discussed just above, the primary reason for including a controller section in a flash medium is for error correction. This task is now shifted either to firmware 4012b of the host computer, which now, on top of its normal access section software, also manages error correction and bad block mapping of chip(s) 4022 and stores those parameters in flash medium 4020b itself. Or in some cases, this function may be shifted to driver software 4002b in the host computer 4000.

Often this error mapping and other functions may be handled in combination between those two software elements (firmware 4012b and driver software 4002b), or in some cases it may be shifted entirely to firmware 4012b, which allows the driver software 4002 to remain a standard removable medium driver rather than including specialized firmware. Shifting control entirely to firmware 4012b allows for transparent use of the flash, much as the original controller 4021 (FIG. 30) did. Thus an operating system would not be able to distinguish one from the other, and no special drivers, patches, etc., would have to be installed by the user.

Identification 4030 makes use of those pins discussed in the sections' above (see FIG. 5, for example), and in all those cases discussed above, a mechanical-electrical medium adapter may be used on bus 4011 for different electromechanical connection interfaces, etc.

Figure 32:
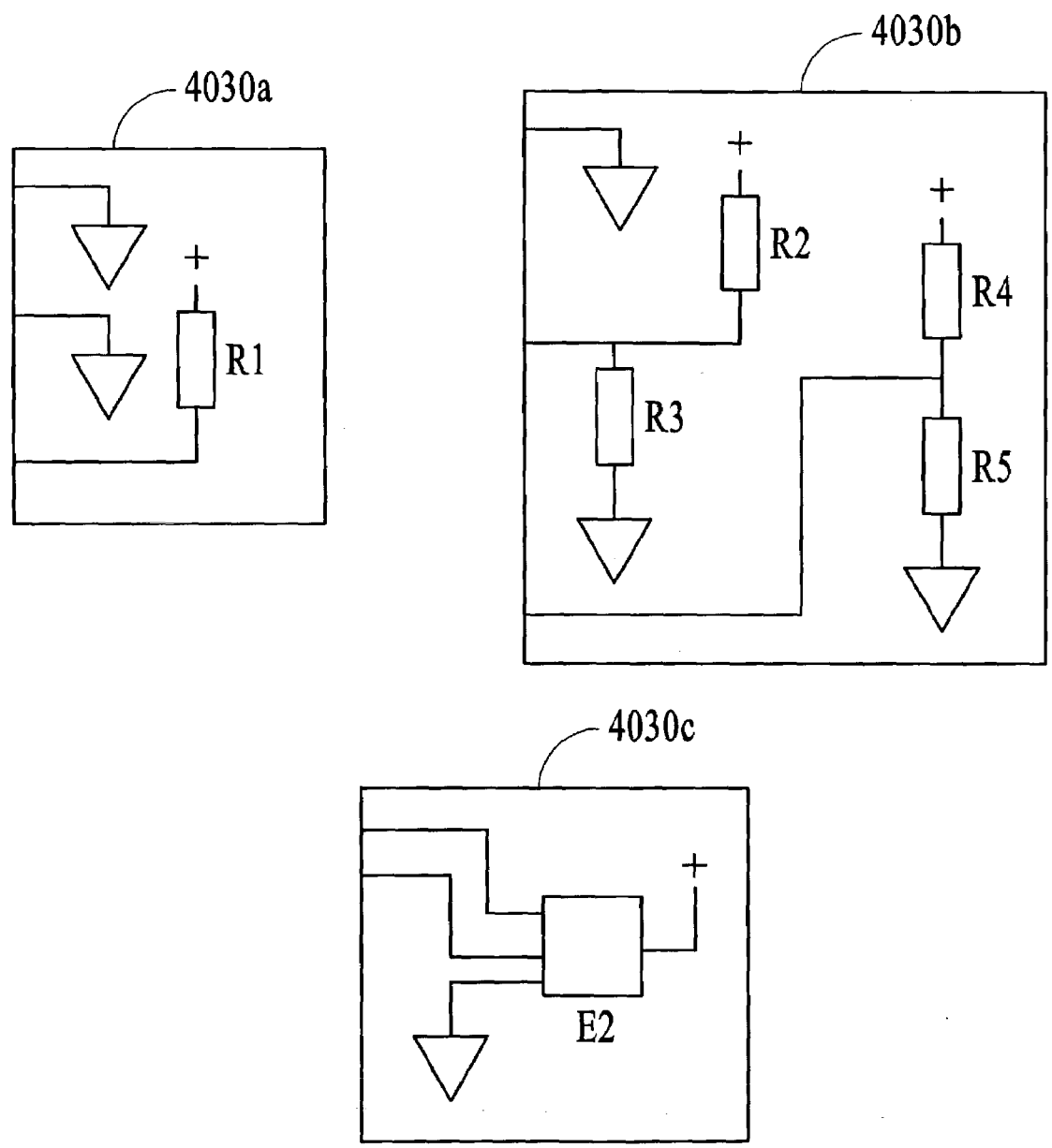
FIG. 32 shows various implementations of ID 4030.

FIG. 32 shows various implementations of ID 4030. For example, ID 4030a uses simple pull-ups and pull-downs, as discussed earlier. ID 4030b uses, rather than simple pull-ups and pull-downs, voltage dividers, in this example consisting of R2/R3 and R4/R5. By using voltage dividers, a limited number of pins, such as, for example, two, can be stretched into offering 16 or even more different types of cards or IDs, based on the fact that, rather than one bit per pin (high or low), multiple voltage levels (and hence multiple bits) per pin can now be supported, using voltage dividers, and therefore many more card combinations can be identified through a limited number of pins. On the controller side, comparators may be used to regenerate digital signals (not shown for clarity).

ID 4030c achieves the same result by having a small $E^2$ programmable ROM as a digital ID. This could be a mask program or $E^2$-type serial memory, which is available very inexpensively. The $E^2$ could be programmed at the factory or in the field through firmware 4012b. Many types of low pin count serial buses are known to the inventor and to those skilled in the art (such as Single Wire™ by Dallas Semiconductor, $I^2C$ etc.), counting from 1–4 pins including power in some cases. The advantage of using the $E^2$ would be, for example, to allow use of a flash chip 4022 that even has a bad boot sector, because a new boot sector address could be incorporated into 4030c, rather than having to rely on the main storage 4022 to be error free.

As the industry moves to higher and higher single-chip capacity, the chances of having bad sectors in the boot section increase. By moving the boot sector address into an auxiliary device, such as ID 4030c, the yield of usable chips 4022 can be dramatically increased, and therefore costs can be further reduced.

Also, elimination of the controller 4021 helps to further reduce the cost of medium 4022. By having a combined firmware 4012b that can handle both media cards 4022 with controllers of all formats discussed above and of others not discussed, as well as controller-less media cards such as 4020b, with an ID 4030, backward compatibility is guaranteed in the market.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A controller chip comprising:
   an interface mechanism capable of receiving flash storage systems with controllers and flash storage systems without controllers, a flash storage system to be coupled to a computer system;
   a detector to determine whether the flash storage system includes a controller for error correction; and
   a flash adapter to interface the computer system with the flash storage system, the flash adapter comprising:
   a first interface to be coupled to the computer system;
   a second of interface to be coupled to the flash storage system, wherein the flash storage system comprises a flash section and at least a medium ID; and
   a firmware in the flash adapter, in an event where the flash storage system does not have a controller for error correction, to perform operations to manage error correction of the flash section in the flash storage system that is coupled to the flash adapter by the second interface, including bad block mapping of the flash section.

2. The controller chip of claim 1, wherein the medium ID contains specifications of the flash storage system.

3. The controller chip of claim 2, wherein the flash adapter further comprises at least another portion of the medium ID.

4. The controller chip of claim 2, wherein the medium ID comprises a pull-up resistor and a pull-down resistor.

5. The controller chip of claim 2, wherein the medium ID further comprises a voltage divider.

6. The controller chip of claim 2, wherein the medium ID further comprises an EEPROM device to store the specifications of the flash storage system.

7. A method comprising:
   using a controller chip to interface a flash storage system with or without a controller to a computing device, the controller chip comprising a flash adapter, wherein the flash storage system comprises a flash section and at least a medium ID;
   determining whether the flash storage system includes a controller for error correction; and
   in an event where the flash storage system does not have a controller for error correction, using firmware in the flash adapter to perform operations to manage error correction of the flash section, including bad block mapping of the flash section in the flash storage system that is coupled to the flash adapter section.

8. The method of claim 7, further comprising: storing specifications of the flash storage system in the medium ID.

9. The method of claim 7, further comprising updating the specifications in the medium ID during bad block mapping of the flash section, wherein the medium ID comprises one or more EEPROM devices to store the specifications.

10. The method of claim 7, further comprising examining the medium ID to identify a type of the flash storage system, wherein the medium ID comprises at least one of a pull-up resistor, a pull-down resistor, and a voltage divider.

11. A system comprising:
    a computing device;
    a flash storage system comprising a flash section and at least a portion of a medium ID; and
    a controller chip coupled between the computing device and the flash storage system to interface the flash storage system to the computing device, the controller chip comprising an interface mechanism capable of receiving flash storage systems with controller and controllerless flash storage systems, a detector to determine whether the flash storage system includes a controller for error correction and a flash adapter which comprises firmware to perform, in an event where the flash storage system does not have a controller for error correction, operations to manage error correction of the flash section, including bad block mapping of the flash section in the flash storage system that is coupled to the flash adapter section.

12. The system of claim 11, wherein the medium ID contains specifications of the flash storage system.

13. The system of claim 12, wherein the flash adapter further comprises at least another portion of the medium ID.

14. The system of claim 12, wherein the medium ID comprises a pull-up resistor and a pull-down resistor.

15. The system of claim 12, wherein the medium ID comprises a voltage divider.

16. The system of claim 12, wherein the medium ID comprises an EEPROM device to store the specifications of the flash storage system.

17. The controller chip of claim 1, wherein the flash adapter further comprises a plurality of interfaces for receiving a plurality of flash storage systems.

18. The controller chip of claim 1, wherein the bad block mapping includes addressing a new boot sector to allow use of the storage system with a bad boot sector.

19. The method of claim 7, wherein the flash adapter further comprises a plurality of interfaces for receiving a plurality of flash storage systems.

20. The method of claim 7, wherein the bad block mapping includes addressing a new boot sector to allow use of the storage system with a bad boot sector.

21. The system of claim 11, wherein the flash adapter further comprises a plurality of interfaces for receiving a plurality of flash storage systems.

22. The controller chip of claim 11, wherein the bad block mapping includes addressing a new boot sector to allow use of the storage system with a bad boot sector.

* * * * *

UNITED STATES PATENT AND TRADEMARK OFFICE
CERTIFICATE OF CORRECTION

PATENT NO.        : 7,162,549 B2                                          Page 1 of 1
APPLICATION NO.   : 10/264466
DATED             : January 9, 2007
INVENTOR(S)       : Sreenath Mambakkam et al.

It is certified that error appears in the above-identified patent and that said Letters Patent is hereby corrected as shown below:

In Column 1,
Line 17, add the following text: -- Ser. No. 10/039,685 and Ser. No. 10/063,021 are continuations-in-part of Ser. No. 09/610,904, filed on Jul. 6, 2000, now U.S. Pat. No. 6,438,638 entitled "Flashtoaster for Reading Several Types of Flash-Memory Cards With or Without a PC." --

In Column 29,
Line 65, replace "error correction;" with -- error correction,--

In Column 29,
Lines 59-67 should be formatted as follows:
-- 1. A controller chip comprising:
   an interface mechanism capable of receiving flash storage systems with controllers
         and flash storage systems without controllers, a flash storage system to be
   coupled to a computer system; a detector to determine whether the flash storage
         system includes a controller for error correction, and a flash adapter to interface
   the computer system with the flash storage system, the flash adapter comprising: --

In Column 30,
Line 2, replace "a second of interface" with -- a second interface --

Signed and Sealed this

Thirteenth Day of March, 2007

JON W. DUDAS
*Director of the United States Patent and Trademark Office*